US009704273B2

(12) United States Patent
Endo et al.

(10) Patent No.: US 9,704,273 B2
(45) Date of Patent: Jul. 11, 2017

(54) IMAGE PROCESSING DEVICE, METHOD, AND IMAGING DEVICE

(71) Applicant: SOCIONEXT INC., Yokohama-shi, Kanagawa (JP)

(72) Inventors: Kentaro Endo, Kawasaki (JP); Junzo Sakurai, Ingagi (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/822,679

(22) Filed: Aug. 10, 2015

(65) Prior Publication Data
US 2016/0078638 A1 Mar. 17, 2016

(30) Foreign Application Priority Data
Sep. 11, 2014 (JP) .................. 2014-185030

(51) Int. Cl.
*G06K 9/00* (2006.01)
*G06T 11/00* (2006.01)
(Continued)

(52) U.S. Cl.
CPC .............. *G06T 11/001* (2013.01); *H04N 1/00* (2013.01); *H04N 1/60* (2013.01); *H04N 1/6027* (2013.01);
(Continued)

(58) Field of Classification Search
CPC ....... G06T 3/4015; G06T 5/002; G06T 5/003; G06T 5/008; G06T 5/20; G06T 7/408; G06T 11/001; G06T 2207/10024; G06T 2207/20192; H04N 1/56; H04N 1/58; H04N 5/142; H04N 5/20; H04N 5/202; H04N 5/23203; H04N 5/235; H04N 5/2355; H04N 9/63; H04N 9/64; H04N 9/646; H04N 9/67; H04N 9/73; H04N 1/00; H04N 1/60; H04N 1/6027; H04N 5/00; H04N 9/43; H04N 9/68; H04N 9/77; G06K 9/00228
See application file for complete search history.

(56) References Cited

U.S. PATENT DOCUMENTS 8,797,427 B2* 8/2014 Tsutsumi ........... H04N 5/23203
348/223.1
2005/0123213 A1 6/2005 Kugo
(Continued)

FOREIGN PATENT DOCUMENTS

JP 2004-038842 A 2/2004
JP 2004-235850 A 8/2004
(Continued)

*Primary Examiner* — Jose Couso
(74) *Attorney, Agent, or Firm* — Arent Fox LLP

(57) ABSTRACT

An image processing device including: a color correction section that is input with an RGB signal, and performs color correction on the RGB signal; a YC conversion section that converts the color corrected RGB signal to a first brightness signal and a color difference signal; a Y conversion section that is input with the RGB signal, and generates a second brightness signal from the RGB signal; a processor configured to execute a process, the process including computing a ratio at which to combine the first brightness signal and the second brightness signal based on the RGB signal; and a combining section that combines the first brightness signal and the second brightness signal at the computed ratio.

12 Claims, 23 Drawing Sheets

(51) Int. Cl.
*H04N 1/60* (2006.01)
*H04N 1/00* (2006.01)
*H04N 5/202* (2006.01)
*H04N 9/68* (2006.01)
*H04N 9/77* (2006.01)

(52) U.S. Cl.
CPC ............... *H04N 5/202* (2013.01); *H04N 9/68* (2013.01); *H04N 9/77* (2013.01)

(56) References Cited

U.S. PATENT DOCUMENTS

2008/0219586 A1 9/2008 Watanabe et al.
2010/0231759 A1 9/2010 Tsutsumi et al.

FOREIGN PATENT DOCUMENTS

| | | |
|---|---|---|
| JP | 2005-141477 A | 6/2005 |
| JP | 2010-219797 A | 9/2010 |

* cited by examiner

FIG.12

| | Rc | Gc | Bc |
|---|---|---|---|
| 0 | 1.3327 | 1.3673 | 1.6042 |
| 1 | 1.7594 | 1.5348 | 2.1013 |
| 2 | 2.7824 | 2.6605 | 3.1024 |
| 3 | 2.7570 | 3.0921 | 2.8436 |
| 4 | 2.3229 | 2.2637 | 2.9869 |
| 5 | 1.6860 | 1.7560 | 1.6447 |
| 6 | 2.6170 | 1.8726 | 1.4983 |
| 7 | 2.1676 | 2.1383 | 2.4560 |
| 8 | 2.7552 | 2.5825 | 2.6224 |
| 9 | 1.9010 | 1.7218 | 1.9810 |
| 10 | 2.5454 | 2.3481 | 1.8902 |
| 11 | 2.0238 | 1.7630 | 1.4256 |
| 12 | 1.6282 | 1.6652 | 2.7707 |
| 13 | 1.0568 | 1.4582 | 1.3699 |
| 14 | 1.7504 | 1.6423 | 1.4099 |
| 15 | 2.6230 | 1.9960 | 1.1917 |
| 16 | 2.9956 | 2.9989 | 3.0054 |
| 17 | 1.1926 | 1.6080 | 1.6827 |
| 18 | 2.5948 | 2.9755 | 3.8747 |
| 19 | 2.1159 | 2.4042 | 2.3856 |
| 20 | 2.0308 | 1.8877 | 2.0996 |
| 21 | 2.4165 | 2.3213 | 2.3360 |
| 22 | 1.8010 | 1.7953 | 1.8464 |
| 23 | 1.6379 | 1.6852 | 2.00396 |

FIG.14

| REGION | Yb BLEND RATIO | REGION | Yb BLEND RATIO |
|---|---|---|---|
| 1A | 50 | 3A | 50 |
| 1B | 50 | 3B | 80 |
| 1C | 50 | 3C | 20 |
| 1D | 80 | 3D | 50 |
| 1E | 50 | 3E | 20 |
| 2A | 50 | 4A | 50 |
| 2B | 50 | 4B | 20 |
| 2C | 50 | 4C | 80 |
| 2D | 50 | 4D | 50 |
| 2E | 50 | 4E | 50 |

29B

| REGION | Yb BLEND RATIO | REGION | Yb BLEND RATIO |
|---|---|---|---|
| 1A | 50 | 3A | 50 |
| 1B | 50 | 3B | 50 |
| 1C | 50 | 3C | 50 |
| 1D | 50 | 3D | 50 |
| 1E | 50 | 3E | 50 |
| 2A | 50 | 4A | 50 |
| 2B | 50 | 4B | 50 |
| 2C | 25 * FLESH COLOR CONSIDERED IMPORTANT | 4C | 40* SKY COLOR CONSIDERED IMPORTANT |
| 2D | 50 | 4D | 50 |
| 2E | 50 | 4E | 50 |

FIG.17

| No. | ⊿E*ab | No. | ⊿E*ab | No. | ⊿E*ab |
|---|---|---|---|---|---|
| 0 | 0.00 | 6 | 0.00 | 12 | 7.28 |
| 1 | 0.00 | 7 | 8.12 | 13 | 3.32 |
| 2 | 4.24 | 8 | 5.74 | 14 | 4.58 |
| 3 | 1.41 | 9 | 2.00 | 15 | 2.45 |
| 4 | 2.00 | 10 | 1.00 | 16 | 5.74 |
| 5 | 6.40 | 11 | 1.41 | 17 | 3.16 |

FIG.18

| REGION | Yb BLEND RATIO | REGION | Yb BLEND RATIO |
|---|---|---|---|
| 1A | 50 | 3A | 50 |
| 1B | 50 | 3B | 50 |
| 1C | 50 | 3C | 50 |
| 1D | 50 | 3D | 50 |
| 1E | 50 | 3E | 50 |
| 2A | 50 | 4A | 50 |
| 2B | 100 | 4B | 50 |
| 2C | 100 | 4C | 50 |
| 2D | 50 | 4D | 50 |
| 2E | 50 | 4E | 50 |

29D

IMAGE PROCESSING DEVICE, METHOD, AND IMAGING DEVICE

CROSS-REFERENCE TO RELATED APPLICATION

This application is based upon and claims the benefit of priority of the prior Japanese Patent Application No. 2014-185030, filed on Sep. 11, 2014, the entire contents of which are incorporated herein by reference.

FIELD

The embodiments discussed herein are related to an image processing device, an image processing method, and an imaging device.

BACKGROUND

Image processing devices have hitherto been proposed that combine a Yb signal, which is a brightness signal generated from RGB signals prior to color correction, and a Ya signal, which is a brightness signal generated from RGB signals after color correction, at specific proportions to generate an image brightness signal Y.

RELATED PATENT DOCUMENTS

Japanese Laid-Open Patent Publication No. 2010-219797

SUMMARY

According to an aspect of the embodiments, an image processing device includes: a color correction section that is input with an RGB signal, and performs color correction on the RGB signal; a YC conversion section that converts the color corrected RGB signal to a first brightness signal and a color difference signal; a Y conversion section that is input with the RGB signal, and generates a second brightness signal from the RGB signal; a processor configured to execute a process, the process including computing a ratio at which to combine the first brightness signal and the second brightness signal based on the RGB signal; and a combining section that combines the first brightness signal and the second brightness signal at the computed ratio.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a table illustrating an example of standard deviations of respective Rc signals, Gc signals, and Bc signals post color correction for each color;

FIG. 14 is a table illustrating an example of a Yb blend ratio table in the third exemplary embodiment;

FIG. 17 is a table illustrating an example of color differences for each color between cases of a Yb blend ratio of 0% and 100%;

FIG. 18 is a table illustrating an example of a Yb blend ratio table in a fifth exemplary embodiment;

DESCRIPTION OF EMBODIMENTS

Detailed explanation follows regarding an example of an exemplary embodiment according to technology disclosed herein, with reference to the drawings.

First Exemplary Embodiment

Figure 1:
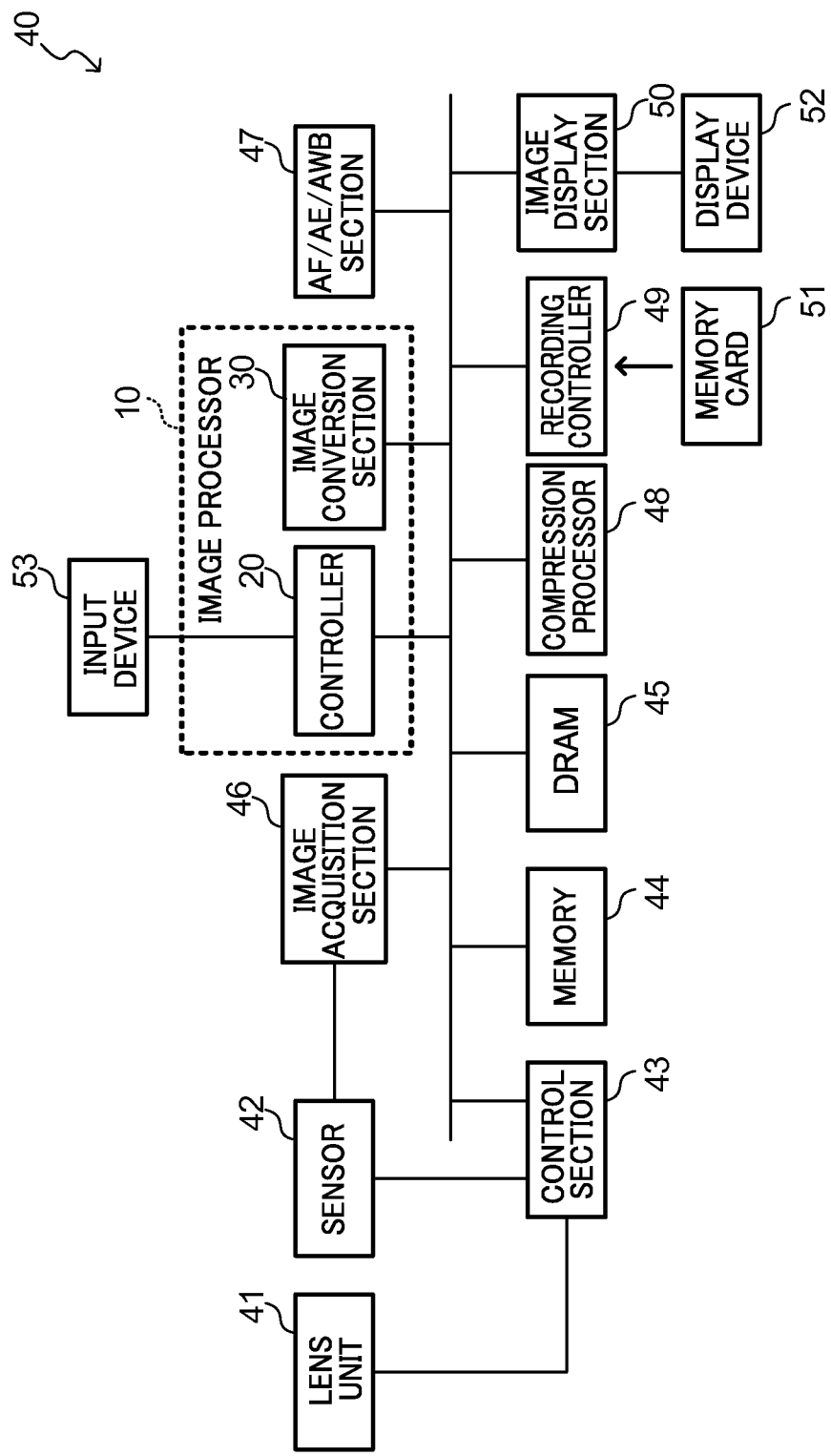
FIG. 1 is a block diagram illustrating a schematic configuration of an imaging device according to first to eighth exemplary embodiments.

FIG. 1 illustrates an imaging device 40 according to the first exemplary embodiment. The imaging device 40 includes a lens unit 41, a sensor 42, a control section 43, memory 44, and dynamic random access memory (DRAM) 45. The imaging device 40 also includes an image acquisition section 46, a controller 20, an image conversion section 30, an AF/AE/AWB section 47, a compression processor 48, a recording controller 49, an image display section 50, a display device 52, and an input device 53.

The lens unit 41 includes a group of lenses including plural optical lenses, an aperture adjustment mechanism, a zoom mechanism, etc., and forms an image of light reflected by a subject in the imaging environment on the sensor 42. The sensor 42 is, for example, an image pick-up device, such as a charge coupled device (CCD) or a complementary metal oxide semiconductor (CMOS). The sensor 42 converts light incident to the lens unit 41 into an electrical signal, and outputs the electrical signal.

The control section 43 receives instructions from the controller 20, and drives each of the mechanisms of the lens unit 41. The control section 43 drives the sensor 42 at a specific timing instructed by the controller 20, and causes an electrical signal representing a captured image to be output from the sensor 42.

The controller 20 may be implemented by a central processing unit (CPU) or the like. The controller 20 controls each of the sections of the imaging device 40, and controls the input and output of data to and from each section. The memory 44 is stored with various data and programs needed for processing by each of the sections. The DRAM 45 is buffer memory for temporarily storing image data output from the image acquisition section 46, described below. The DRAM 45 is utilized as a working area during processing by each of the sections.

The image acquisition section 46 acquires an electrical signal (analogue signal) output from the sensor 42, converts the acquired signal into image data of a digital signal, and outputs the digital signal. The image conversion section 30 performs image processing, such as demosaicing processing, gradation correction, and color correction on the image data output from the image acquisition section 46, and outputs the image data post-image processing. The AF/AE/AWB section 47 performs processing for automatic focus (AF), automatic exposure (AE), and automatic white balance (AWB) based on the image data output from the image conversion section 30. The compression processor 48 compresses the image data output from the image conversion section 30 using a specific format, for example joint photographic experts group (JPEG), and outputs the compressed data.

The recording controller 49 controls processing to write image data compressed by the compression processor 48 to a recording medium such as a memory card 51, and controls processing to read the image data from the recording medium. The image display section 50 controls to display the image data image processed by the image conversion section 30, and the image data read from the memory card 51, on the display device 52. The display device 52 is, for example, a liquid crystal display. The image display section 50 controls so as to display a menu screen for performing various settings or the like on the display device 52. The input device 53 is a device for imputing information to the imaging device 40, such as a shutter switch, a zoom key, operation keys for performing various types of setting, and a touch panel provided together with the display device 52. The input information is received and processed by the controller 20.

An image processor 10 is implemented as an example of an image processing device according to technology disclosed herein by some of the functions of the controller 20 and part of the configuration of the image conversion section 30.

Figure 2:
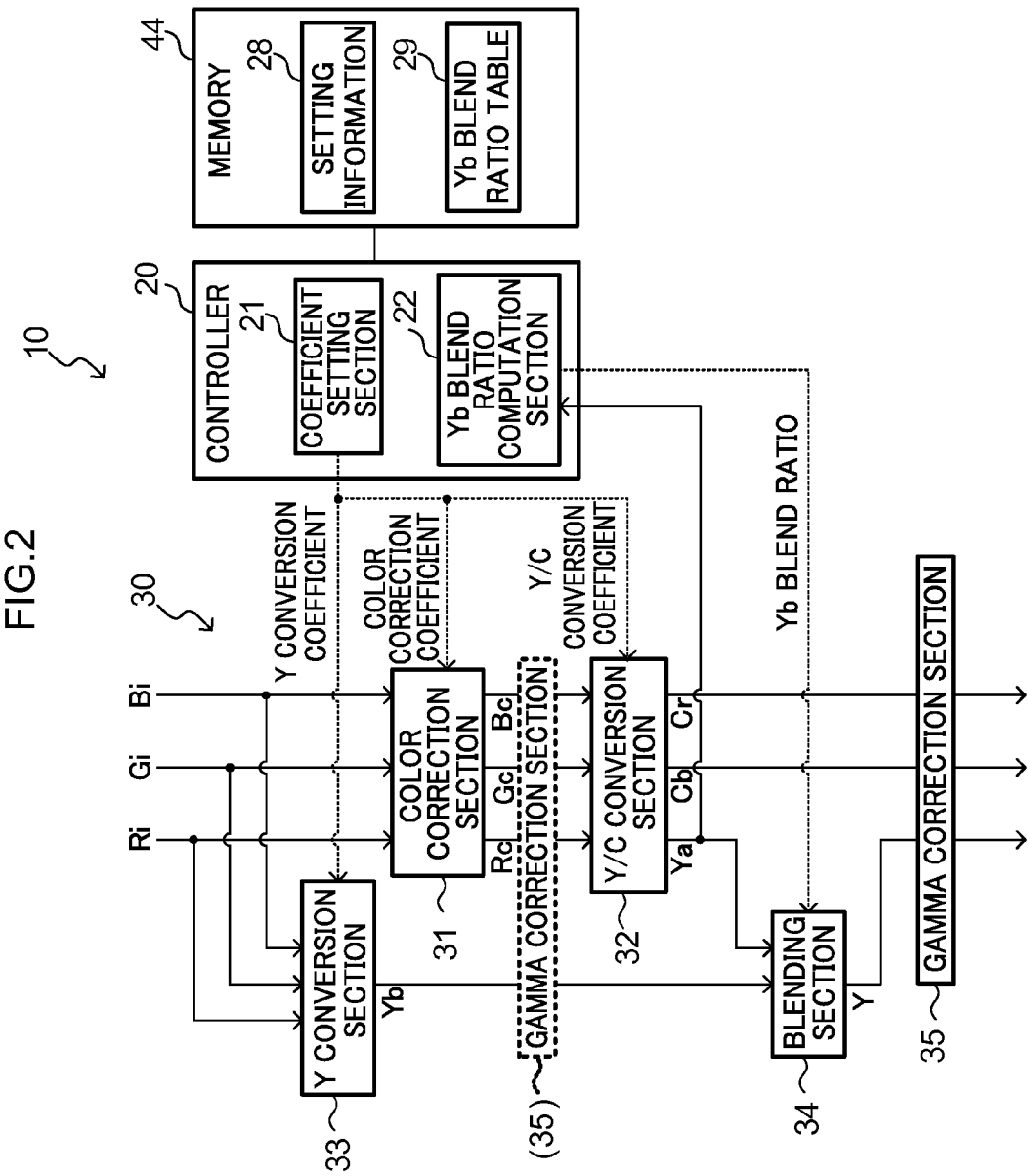
FIG. 2 is a block diagram illustrating a schematic configuration of an image processor according to a first exemplary embodiment.

As illustrated in FIG. 2, functions of the controller 20 for implementing the image processor 10 include a coefficient setting section 21, and a Yb blend ratio computation section 22. Configuration of image conversion section 30 for implementing the image processor 10 includes a color correction section 31, a Y/C conversion section 32, a Y conversion section 33, a blending section 34, and a gamma correction section 35. The Yb blend ratio computation section 22 is an example of a ratio computation section of technology disclosed herein, and the blending section 34 is an example of a combining section of technology disclosed herein.

The coefficient setting section 21 sets the color correction section 31 with a color correction coefficient employed in the color correction section 31. The coefficient setting section 21 sets the Y/C conversion section 32 with Y/C conversion coefficients employed by the Y/C conversion section 32. The coefficient setting section 21 sets the Y conversion section 33 with the Y conversion coefficient employed by the Y conversion section 33. The color correction coefficient, the Y/C conversion coefficients, and the Y conversion coefficient are pre-stored as setting information 28 in the memory 44.

Image data that has been acquired by the image acquisition section 46 and that has been converted into an Ri signal, a Gi signal, and a Bi signal expressing RGB components by demosaicing processing in the image conversion section 30, is input by pixel to the color correction section 31. The color correction section 31 color corrects each of the Ri signal, the Gi signal, and the Bi signal using the color correction coefficients set by the coefficient setting section 21, and outputs an Rc signal, a Gc signal, and a Bc signal post color correction.

The Rc signal, the Gc signal, and the Bc signal output from the color correction section 31 are input to the Y/C conversion section 32. The Y/C conversion section 32 generates a Ya signal that is a brightness signal, and a Cb signal and a Cr signal that are color difference signals, from the Rc signal, the Gc signal, and the Bc signal, using the Y/C conversion coefficients set by the coefficient setting section 21, and outputs the Ya signal, the Cb signal, and the Cr signal.

The Ri signal, the Gi signal, and the Bi signal prior to color correction are input to the Y conversion section 33. The Y conversion section 33 generates the Yb signal that is a brightness signal from the Ri signal, the Gi signal, and the Bi signal, using the Y conversion coefficient set by the coefficient setting section 21, and outputs the Yb signal.

The Ya signal output from the Y/C conversion section 32, and the Yb signal output from the Y conversion section 33, are input to the blending section 34. The blending section 34 generates a Y signal that is a brightness signal of the Ya signal and the Yb signal blended at the Yb blend ratio computed and set by the Yb blend ratio computation section 22, and outputs the Y signal.

The gamma correction section 35 performs and outputs a gamma correction according to the characteristics of the display device 52 on the RGB signal reproduced from the Y signal output from the blending section 34, and the Cb signal and Cr signal output from the Y/C conversion section 32. The gamma correction section 35 may be configured to perform gamma correction on the Yb signal output from the Y conversion section 33, and the Rc signal, the Gc signal, and the Bc signal output from the color correction section 31. In such cases, the post gamma correction Yb signal output from the gamma correction section 35 is input to the blending section 34, and the post gamma correction Rc signal, Gc signal, and Bc signal output from the gamma correction section 35, are input to the Y/C conversion section 32. The former case (the gamma correction section 35 illustrated by the solid line in FIG. 2) is referred to below as having the gamma correction section 35 provided at a later stage, and the latter case (the gamma correction section 35 illustrated by the intermittent line in FIG. 2) is referred to below as having the gamma correction section 35 provided at an early stage.

The Yb blend ratio set in the blending section 34 is the ratio of the Yb signal to the Ya signal during blending the Ya signal and the Yb signal. For example, the Yb blend ratio may be set at a value from 0% to 100%.

The Ya signal here is the brightness signal post color correction, and so has the feature of good color reproducibility when the Ya signal ratio is large in the brightness signal Y; however, there is increased noise due to the color correction. The Yb signal is the brightness signal prior to color correction, and so has the feature of there being a reduction in color reproducibility when the Ya signal ratio is large in the brightness signal Y; however, increase in noise is suppressed.

Figure 3:
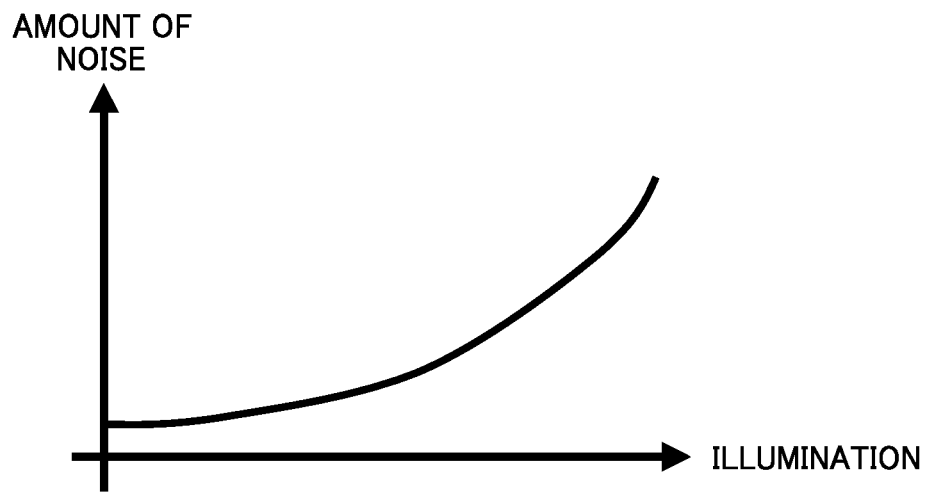
FIG. 3 is a schematic diagram illustrating a relationship between illumination and noise.

As illustrated in FIG. 3, the higher the illumination during imaging with the imaging device 40, the more the amount of noise included in the captured image data increases. The greater the illumination during imaging, the higher the level of the Ya signal output from the Y/C conversion section 32. Thus, by making the Yb blend ratio greater the higher the level of the Ya signal, the noise reduction effect is raised in cases in which there is a large amount of noise. Making the Yb blend ratio smaller the lower the level of the Ya signal prevents the color reproducibility from being unnecessarily suppressed.

Figure 4:
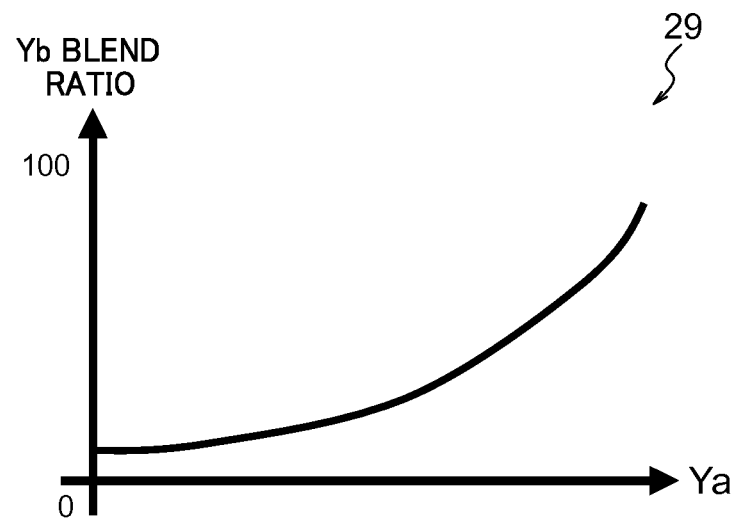
FIG. 4 is a graph illustrating an example of a relationship employed in a Yb blend ratio table in the first exemplary embodiment.

Specifically, in cases in which the gamma correction section 35 is provided at a later stage, for example as illustrated in FIG. 4, a Yb blend ratio table 29, determined such that the Yb blend ratio is greater the higher the level of the Ya signal, is stored in the memory 44. For example, the example of the Yb blend ratio table 29 illustrated in FIG. 4 exhibits the characteristics corresponding to the relationship between illumination and amount of noise as illustrated in FIG. 3. For a level of Ya signal estimated to have a large amount of noise, the Yb blend ratio may, for example, be set as a value close to 100%.

Figure 5:
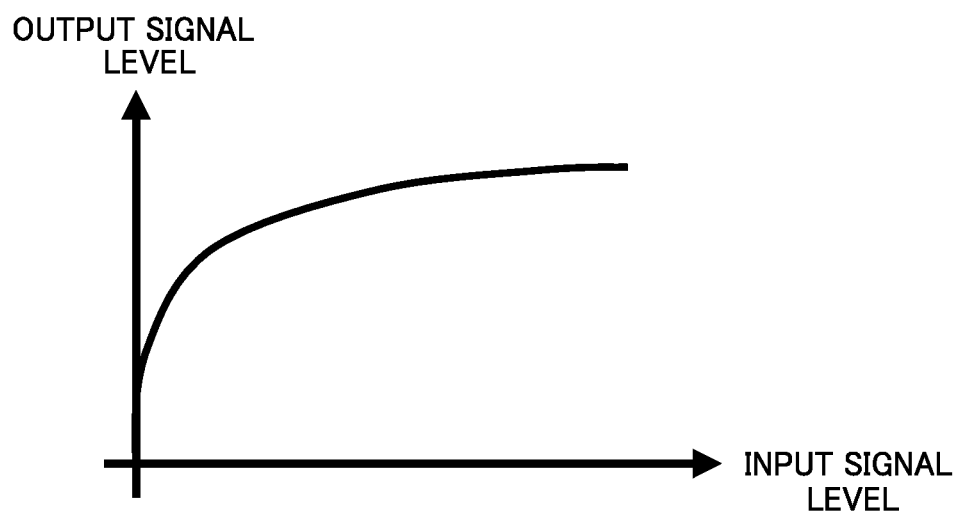
FIG. 5 is a schematic diagram illustrating a gamma characteristic.
Figure 6:
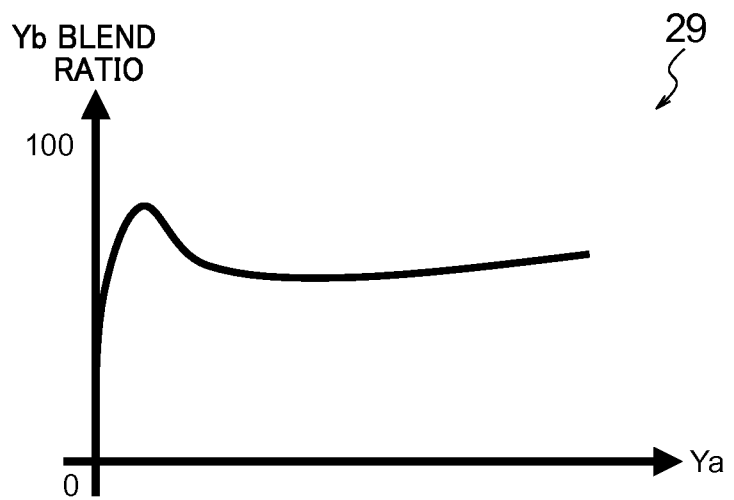
FIG. 6 is a graph illustrating another example of a Yb blend ratio table in the first exemplary embodiment.

In cases in which the gamma correction section 35 is provided at the early stage, there is a need to consider gamma characteristic as illustrated in the example of FIG. 5. In gamma correction, noise increases when there is a large amount of correction performed in gamma correction since the dark sections in the image are corrected to be bright. Thus the Yb blend ratio table 29 is determined to have the characteristics as illustrated in FIG. 6, for example, in consideration of both the relationship between the illumination and the amount of noise as illustrated in FIG. 3, and the relationship to the gamma characteristic as illustrated in FIG. 5, and the Yb blend ratio table 29 is stored in the memory 44.

The Yb blend ratio computation section 22 acquires the Ya signal output from the Y/C conversion section 32, and computes the Yb blend ratio corresponding to the level of the acquired Ya signal with reference to the Yb blend ratio table 29. The Yb blend ratio computation section 22 sets the blending section 34 with the computed Yb blend ratio.

Figure 7:
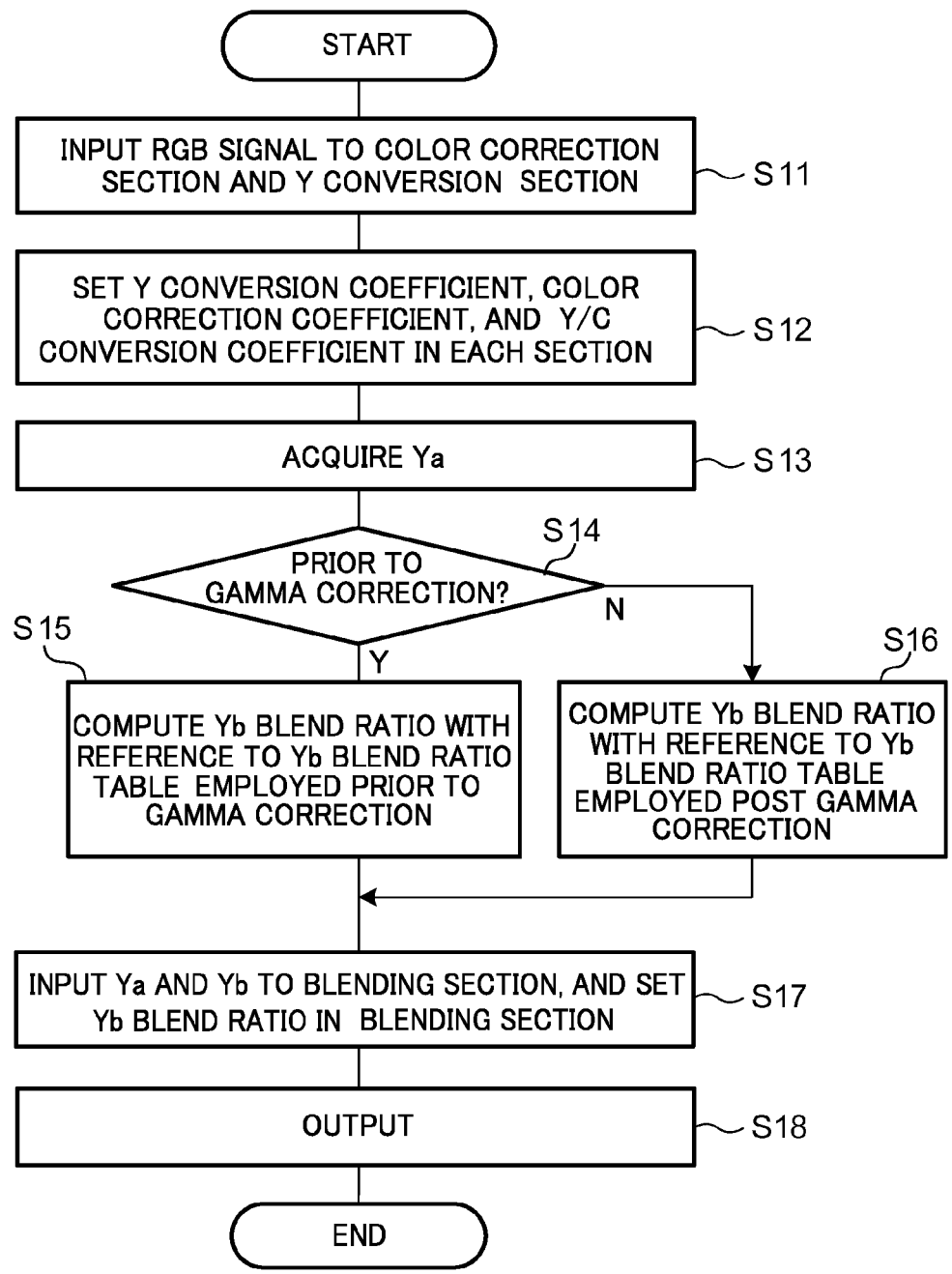
FIG. 7 is a flowchart illustrating an example of image processing in the first exemplary embodiment.

Explanation next follows regarding operation of the image processor 10 of the imaging device 40 according to a first exemplary embodiment. The image processing illustrated in FIG. 7 is executed by the image processor 10. The image processing illustrated in FIG. 7 is executed on each of the pixels of the image data.

At step S11 of the image processing illustrated in FIG. 7, the controller 20 inputs the color correction section 31 and the Y conversion section 33 with a single pixel worth of the Ri signal, the Gi signal, and the Bi signal generated by the demosaicing processing.

At the next step S12, the coefficient setting section 21 sets the color correction section 31 with the color correction coefficient to be employed by the color correction section 31. The coefficient setting section 21 sets the Y/C conversion section 32 with the Y/C conversion coefficients to be employed by the Y/C conversion section 32. The coefficient setting section 21 sets the Y conversion section 33 with the Y conversion coefficient to be employed by the Y conversion section 33.

The respective Ri signal, the Gi signal, and the Bi signal are thereby color corrected in the color correction section 31, and the Rc signal, the Gc signal, and the Bc signal post color correction are each output. The Rc signal, the Gc signal, and the Bc signal that have been output from the color correction section 31 are then input to the Y/C conversion section 32. In the Y/C conversion section 32, the Ya signal, the Cb signal, and the Cr signal are generated from the Rc signal, the Gc signal, and the Bc signal, and then output. In the Y conversion section 33, the Yb signal is generated from the Ri signal, the Gi signal, and the Bi signal prior to color correction, and output.

In cases in which the gamma correction section 35 is provided at the early stage, the Yb signal output from the Y conversion section 33, and the Rc signal, the Gc signal, and the Bc signal output from the color correction section 31, are input to the gamma correction section 35. Gamma correction is then performed in the gamma correction section 35, and the Yb signal, the Rc signal, the Gc signal, and the Bc signal post gamma correction are output from the gamma correction section 35. The Rc signal, the Gc signal, and the Bc signal output from the gamma correction section 35 are input to the Y/C conversion section 32, and the Ya signal, the Cb signal, and the Cr signal are output from the Y/C conversion section 32.

Next, at step S13, the Yb blend ratio computation section 22 acquires the Ya signal output from the Y/C conversion section 32. Next, at step S14, determination is made as to whether or not the Ya signal acquired by the Yb blend ratio computation section 22 is a signal prior to gamma correction. In cases in which the gamma correction section 35 is provided at the later stage, the Ya signal is determined to be prior to gamma correction, and processing proceeds to step S15. In cases in which the gamma correction section 35 is provided at the early stage, the Ya signal is determined to be post gamma correction, and processing proceeds to step S16. Note that whether or not the gamma correction section 35 is provided at the early stage or the later stage may be stored in the memory 44 as the setting information 28.

At step S15, the Yb blend ratio computation section 22 computes the Yb blend ratio corresponding to the level of the Ya signal acquired at step S13, with reference to a Yb blend ratio table 29 that does not consider the gamma characteristic, such as the example illustrated in FIG. 4 for use prior to gamma correction. At step S16, the Yb blend ratio computation section 22 computes the Yb blend ratio corresponding to the level of the Ya signal acquired at step S13, with reference to a Yb blend ratio table 29 that considers the gamma characteristic, such as the example illustrated in FIG. 6 for use post gamma correction.

Next, at step S17, the Yb blend ratio computation section 22 inputs the Ya signal output from the Y/C conversion section 32 and the Yb signal output from the Y conversion section 33 to the blending section 34, and sets the blending section 34 with the computed Yb blend ratio. In cases in which the gamma correction section 35 is provided at the early stage, the Yb signal input to the blending section 34 is the Yb signal output from the gamma correction section 35.

The blending section 34 accordingly generates and outputs the Y signal of the Ya signal and the Yb signal blended at the set Yb blend ratio. In cases in which the gamma correction section 35 is provided at the later stage, the Y signal output from the blending section 34, and the Cb signal and the Cr signal output from the Y/C conversion section 32, are input to the gamma correction section 35. Gamma correction is then performed on the RGB signal reproduced from the Cb signal and the Cr signal, and the gamma corrected signal is then output.

Next, at step S18, in cases in which the gamma correction section 35 is provided at the early stage, the controller 20 collectively outputs the Y signal output from the blending section 34, and the Cb signal and the Cr signal output from the Y/C conversion section 32. In cases in which the gamma correction section 35 is provided at the later stage, the controller 20 collectively outputs the Y signal, the Cb signal, and the Cr signal output from the gamma correction section 35.

In cases in which no change is needed to the color correction coefficient, the Y/C conversion coefficients, and the Y conversion coefficient for each of the pixels, it is sufficient to perform the processing of above step S12 only once when performing processing on the Ri signal, the Gi signal, and the Bi signal of the first pixel of the image data.

As explained above, according to the image processor 10 of the imaging device 40 according to the first exemplary embodiment, the Yb blend ratio is made larger the higher the level of the brightness signal Ya post color correction, considering that the amount of noise increases as the brightness of the image increases. This thereby enables the Yb blend ratio to be appropriately set according to the brightness of the image Not raising the Yb blend ratio more than necessary when the amount of noise is small, enables the noise to be reduced while suppressing deterioration in the color reproducibility of the image.

Second Exemplary Embodiment

Explanation next follows regarding a second exemplary embodiment. An imaging device 40 according to the second exemplary embodiment differs from the configuration of the image processor 10 according to the first exemplary embodiment in the configuration of an image processor 10A. In the second exemplary embodiment, explanation will only be given regarding the image processor 10A, and other portions will be allocated the same reference numerals as those of the image processor 10 according to the first exemplary embodiment, with detailed explanation thereof omitted.

Figure 8:
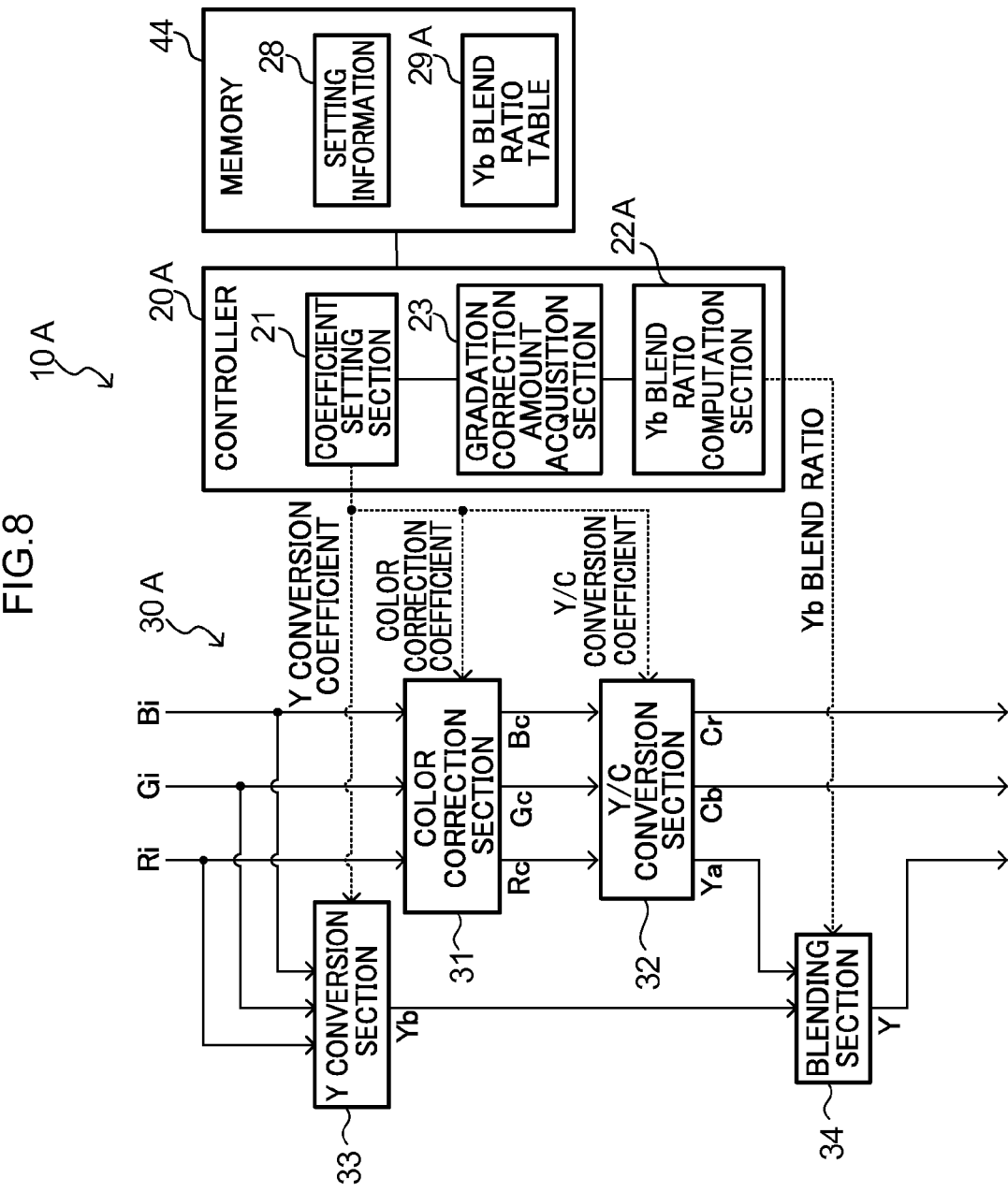
FIG. 8 is a flowchart illustrating a schematic configuration of an image processor according to a second exemplary embodiment.

As illustrated in FIG. 8, the functions of a controller 20A to implement the image processor 10A include a coefficient setting section 21, a Yb blend ratio computation section 22A, and a gradation correction amount acquisition section 23. The configuration of an image conversion section 30A for implementing the image processor 10A includes a color correction section 31, a Y/C conversion section 32, as Y conversion section 33, and a blending section 34.

The gradation correction amount acquisition section 23 acquires a correction amount for gradation correction to be performed on the image data. Gradation correction is, for example, processing to change the tone of an image, such as wide dynamic range (WDR), backlight correction, or mist correction, or gain adjustment performed, for example, when superimposing images of different exposures to synthesize a high dynamic range (HDR). The gradation correction amount acquisition section 23 acquires, as setting information 28, a correction amount for gradation correction that has been computed by a gradation correction section, not illustrated in the drawings, and stored in memory 44.

An image on which gradation correction has been performed as described above has improved visibility; however, sometimes the amount of noise is increased. For example, in cases in which the visibility of a dark image captured at night is improved by WDR processing, the standard deviation of pixel values of dark portions increases as the visibility of the dark portions is improved. Namely, sometimes the amount of noise increases.

Moreover, in an image on which gradation correction has been performed as described above, due to, for example, raising the brightness value in order to improve the visibility in dark portions of the image, sometimes color reproducibility deteriorates due to, for example, washed-out color in portions with originally high brightness values. Namely, gradation correction such as that described above can be thought of as processing that prioritizes improving the visibility over color reproducibility.

The Yb blend ratio computation section 22A accordingly computes the Yb blend ratio so as to be larger the greater the correction amount acquired by the gradation correction amount acquisition section 23, in order to prioritize reducing noise over color reproducibility. For example, a Yb blend ratio table 29A with Yb blend ratios such as 100%, 50%, 0% determined for stepwise classifications of correction amount such as large, medium, small is stored in the memory 44. A computation equation may also be determined so as to make the Yb blend ratio larger the greater the correction amount of the gradation correction.

The Yb blend ratio computation section 22A computes the Yb blend ratio corresponding to the correction amount acquired by the gradation correction amount acquisition section 23, with reference to the Yb blend ratio table 29A. The Yb blend ratio computation section 22A sets the blending section 34 with the computed Yb blend ratio.

Figure 9:
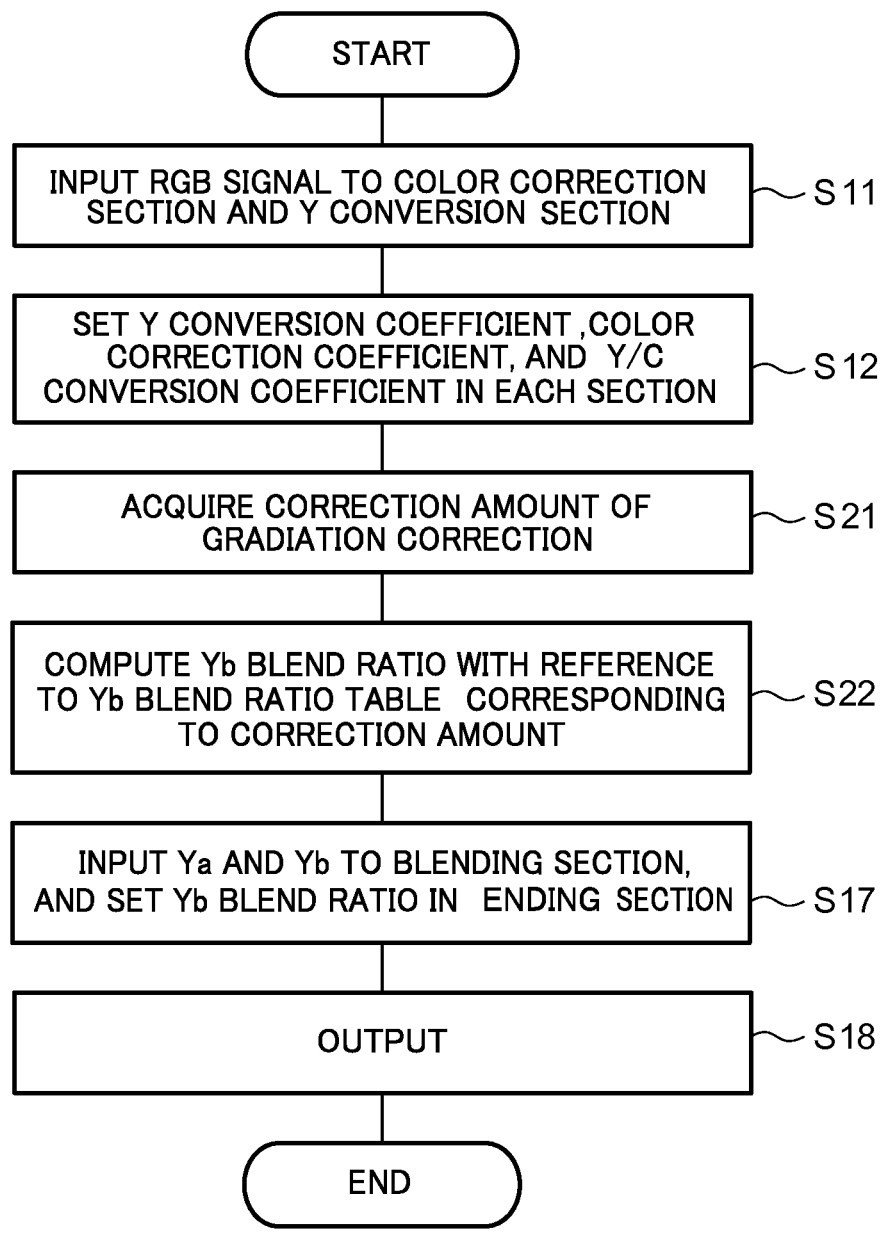
FIG. 9 is a flowchart illustrating an example of image processing in the second exemplary embodiment.

Explanation next follows regarding operation of the image processor 10A of the imaging device 40 according to the second exemplary embodiment. The image processing illustrated in FIG. 9 is executed in the image processor 10A. The same reference numerals are appended to image processing in the second exemplary embodiment similar to that of the image processing in the first exemplary embodiment (FIG. 7), and detailed explanation thereof is omitted.

After passing through the steps S11 and S12 of the image processing illustrated in FIG. 9, at the next step S21, the gradation correction amount acquisition section 23 acquires a correction amount for gradation correction. Next, at step S22, the Yb blend ratio computation section 22A computes the Yb blend ratio corresponding to the correction amount acquired by the gradation correction amount acquisition section 23, with reference to the Yb blend ratio table 29A. Steps S17 and S18 are then executed similarly to in the first exemplary embodiment.

As explained above, the image processor 10A in the imaging device 40 according to the second exemplary embodiment makes the Yb blend ratio larger the greater the correction amount for gradation correction. This thereby enables appropriate setting of the Yb blend ratio according to the correction amount of the gradation correction. Namely, deterioration in color reproducibility is allowed in cases in which visibility is prioritized over color reproducibility, thereby enabling an improvement in the noise reduction effect. However, in cases in which gradation correction to prioritize visibility is not performed, noise is reduced while suppressing deterioration in color reproducibility.

Third Exemplary Embodiment

Explanation next follows regarding a third exemplary embodiment. An imaging device 40 according to the third exemplary embodiment includes a configuration of image processor 10B that differs from the image processor 10A according to the second exemplary embodiment. Explanation follows regarding only the image processor 10B in the third exemplary embodiment, and other parts are allocated the same reference numerals as those of the image processor 10A according to the second exemplary embodiment, and detailed explanation thereof is omitted.

Figure 10:
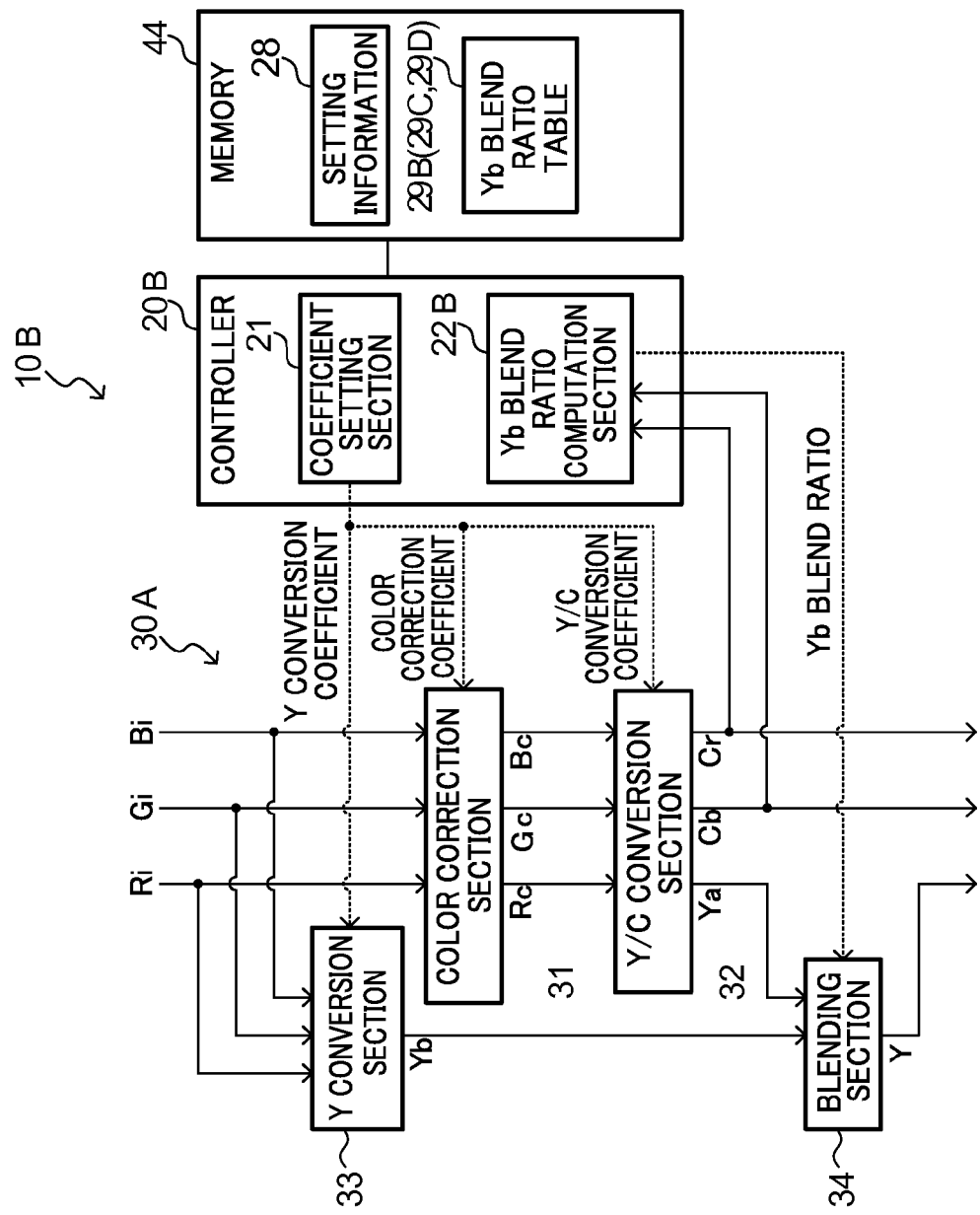
FIG. 10 is a block diagram illustrating a schematic configuration of an image processor of a third exemplary embodiment.

As illustrated in FIG. 10, the functions of a controller 20B to implement the image processor 10B include a coefficient setting section 21, and a Yb blend ratio computation section 22B.

Figure 11:
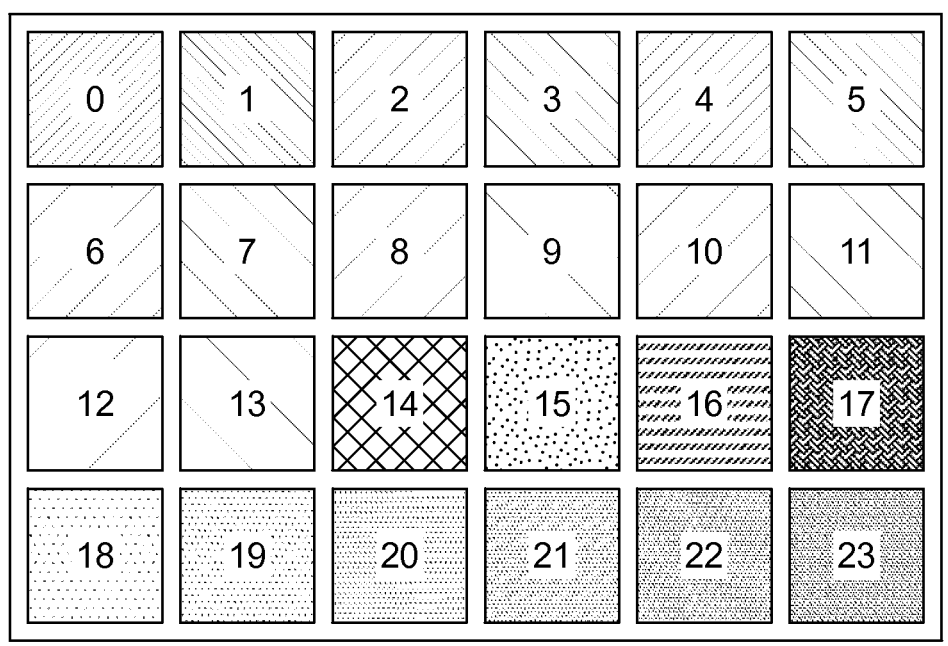
FIG. 11 is a pattern diagram that is a Macbeth chart.

The standard deviations for the respective Rc signal, the Gc signal, and the Bc signal post color correction for each of the colors No. 1 to 23 illustrated in FIG. 11 are illustrated in FIG. 12. FIG. 11 is a general Macbeth chart, with different colors distinguished by type of hatching. The examples of standard deviations illustrated in FIG. 12 are values for cases in which strong color correction is performed. As illustrated in FIG. 12, depending on the color there are some cases of large standard deviation and some cases of small standard deviation, namely some cases with lots of noise and some cases of little noise. For example, there is a lot of noise for the colors No. 2, 3, 16, and little noise for the colors No. 5, 13, 17.

For colors with a lot of noise, the Yb blend ratio computation section 22B computes a large Yb blend ratio, for example a value close to 100%, and for colors with little noise, the Yb blend ratio computation section 22B computes a small Yb blend ratio, for example a value close to 0%.

Figure 13:
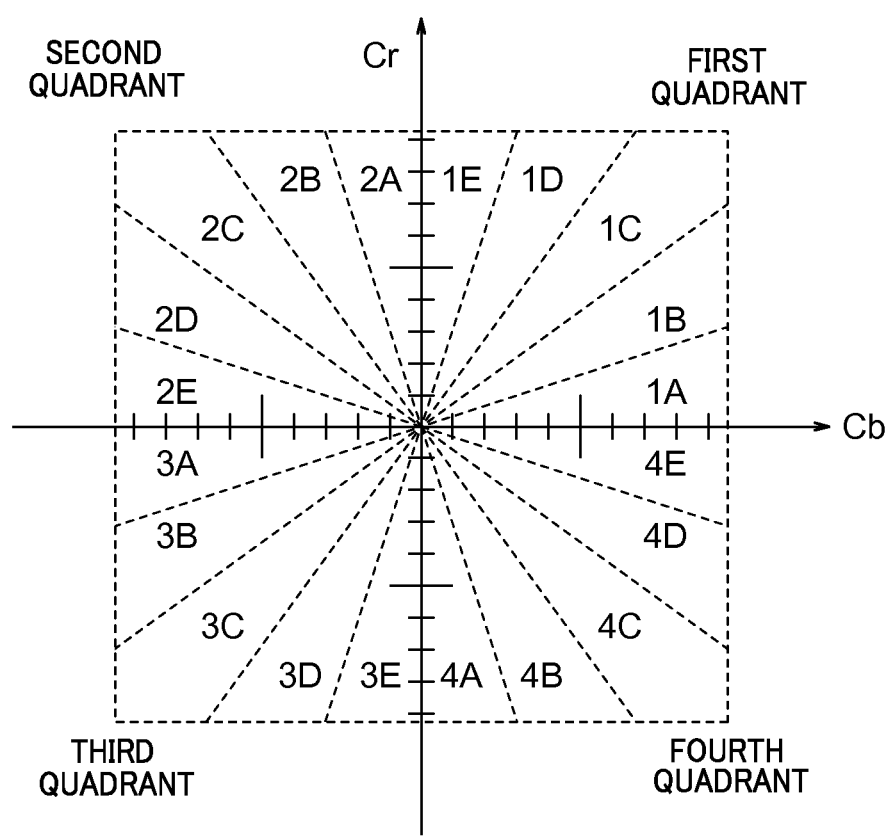
FIG. 13 is a diagram to explain divided regions in a color difference plane.

Specifically, as illustrated in the example in FIG. 13, a color difference plane with the level of the Cr signal and the level of the Cb signal on the two axes is divided into plural regions. In the example in FIG. 13, each of the first to fourth quadrants in the color difference plane is further divided into 5 divisions, to set 20 regions in total. A Yb blend ratio table 29B is stored in the memory 44 with Yb blend ratios determined for each of these regions according to the amount of noise of the color contained in the region. FIG. 14 illustrates an example of a Yb blend ratio table 29B. The example illustrated in FIG. 14 illustrates that a large Yb blend ratio (80 in the example of FIG. 14) is determined for the colors contained in the regions 1D, 3B, 4C due to there being a lot of noise. FIG. 14 also illustrates that a small Yb blend ratio (20 in the example of FIG. 14) is determined for the colors contained in the regions 3C, 4B due to there being little noise. FIG. 14 also illustrates that a standard Yb blend ratio (50 in the example of FIG. 14) is determined for the colors contained in the other regions.

The amount of noise for each color differs according to the strength of color correction, and so the Yb blend ratio table 29B as described above with Yb blend ratios determined for each strength of color correction is stored in the memory 44.

The Yb blend ratio computation section 22B acquires the Cb signal and the Cr signal output from the Y/C conversion section 32, and determines which of the regions determined in the color difference plane such as the example illustrated in FIG. 13 contains the color represented by the Cb signal and the Cr signal. The Yb blend ratio computation section 22B computes the Yb blend ratio corresponding to the determined regions with reference to the Yb blend ratio table 29B. The Yb blend ratio computation section 22B then sets the blending section 34 with the computed Yb blend ratio.

Figure 15:
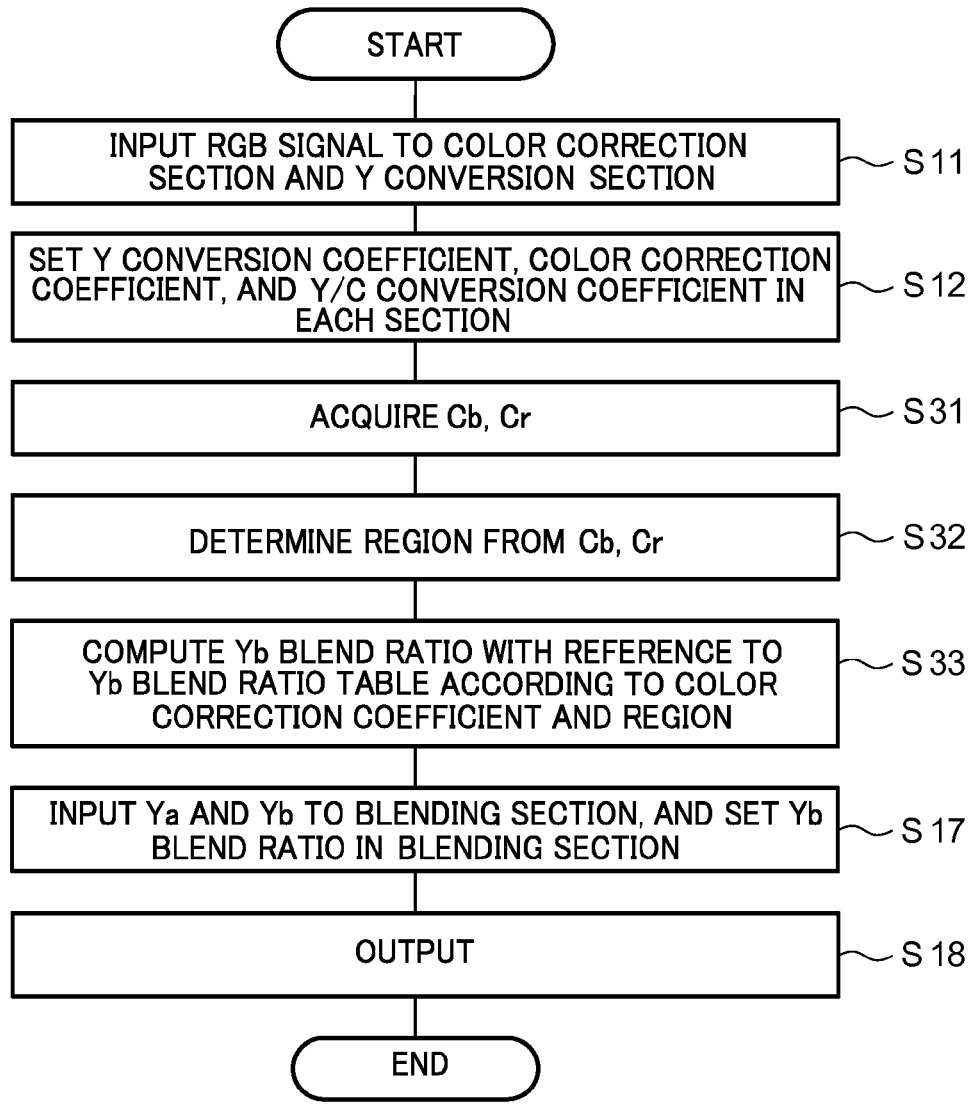
FIG. 15 is a flowchart illustrating an example of image processing in the third exemplary embodiment.

Explanation next follows regarding operation of the image processor 10B of the imaging device 40 according to the third exemplary embodiment. The image processing illustrated in FIG. 15 is executed in image processor 10B. The same reference numerals are appended to image processing of the third exemplary embodiment that is similar processing to that of the image processing in the first exemplary embodiment (FIG. 7), and detailed explanation thereof is omitted.

After passing through the steps S11 and S12 of the image processing illustrated in FIG. 15, at the next step S31, the Yb blend ratio computation section 22B acquires the Cb signal and the Cr signal output from the Y/C conversion section 32. Next, at step S32, the Yb blend ratio computation section 22B determines which region contains the color represented by the Cb signal and the Cr signal.

Next, at step S33, the Yb blend ratio computation section 22B acquires the color correction coefficient set in the color correction section 31 with reference to the setting information 28 of the memory 44, and determines the strength of color correction. Then, with reference to the Yb blend ratio table 29B corresponding to the determined color correction strength, the Yb blend ratio computation section 22B computes the Yb blend ratio corresponding to the region determined at step S32. The steps S17 and S18 are then executed similarly to in the first exemplary embodiment.

As explained above, the image processor 10B of the imaging device 40 of the third exemplary embodiment computes a large Yb blend ratio for colors with a lot of noise, and computes a small Yb blend ratio for colors with little noise. This thereby enables an appropriate Yb blend ratio to be computed for each color according to the amount of noise, enabling noise to be reduced while suppressing deterioration in color reproducibility of images.

Fourth Exemplary Embodiment

Explanation next follows regarding a fourth exemplary embodiment. In the imaging device 40 according to the fourth exemplary embodiment, a Yb blend ratio table 29C employed by an image processor 10B differs from the Yb blend ratio table 29B according to the third exemplary embodiment. In the fourth exemplary embodiment, explanation follows of only the Yb blend ratio table 29C, and other parts are allocated the same reference numerals as those of the image processor 10B according to the third exemplary embodiment, and detailed explanation thereof is omitted.

Figure 16:
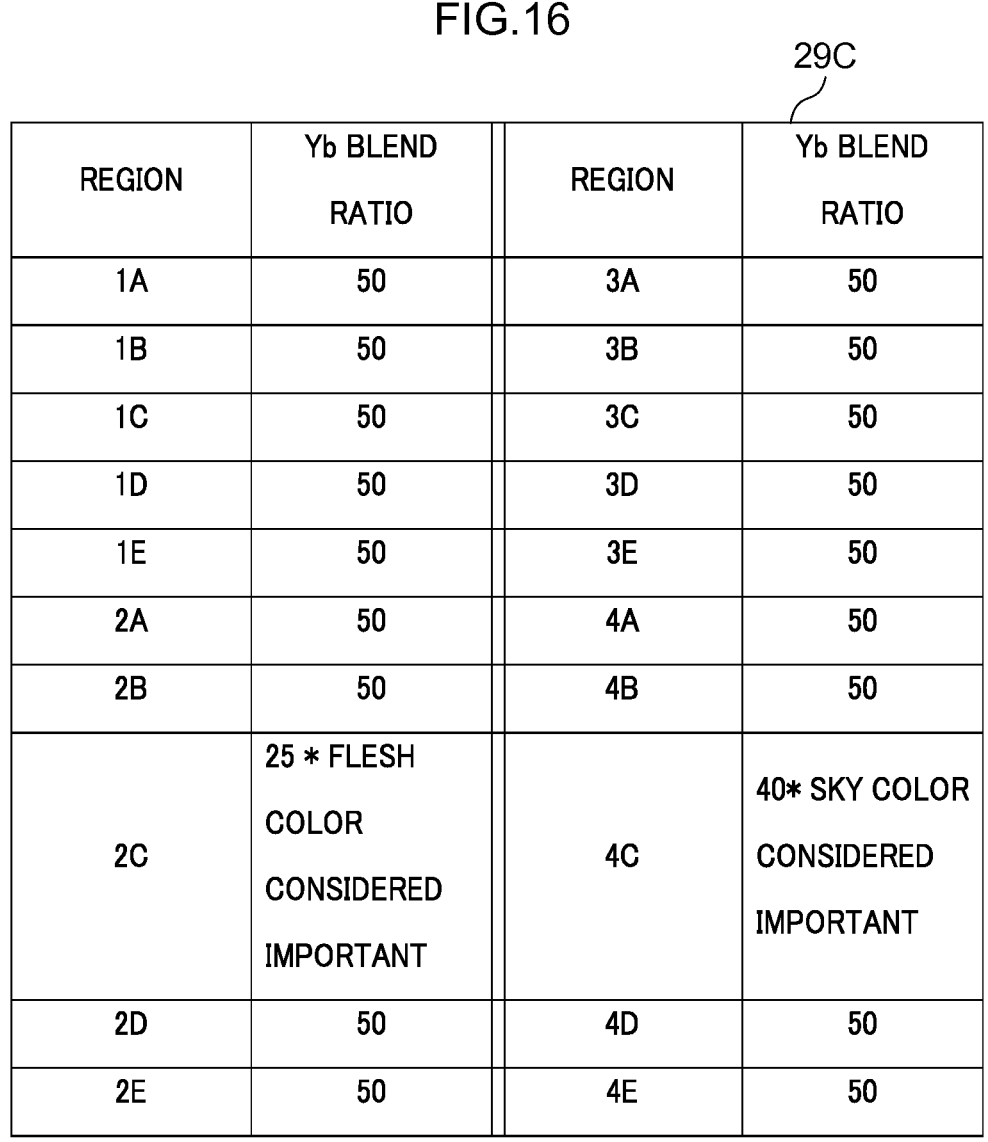
FIG. 16 is a table illustrating an example of a Yb blend ratio table in a fourth exemplary embodiment.

As illustrated in FIG. 16, the Yb blend ratio table 29C in the fourth exemplary embodiment has Yb blend ratios set to values closer to 0 than to a standard value (50 in the example of FIG. 16) for regions in a color difference plane containing colors for which color reproducibility is considered important. In the example illustrated in FIG. 16, flesh color and sky color are set as colors for which color reproducibility is considered important.

Operation of the image processor 10B of the imaging device 40 according to the fourth exemplary embodiment differs only in the Yb blend ratio table 29C referenced at step S33 in the image processing of the third exemplary embodiment (FIG. 15), and explanation thereof is therefore omitted.

As explained above, a small Yb blend ratio is computed by the image processor 10B of the imaging device 40 according to the fourth exemplary embodiment for colors for which color reproducibility is considered important, thereby enabling an appropriate Yb blend ratio to be set. This thereby enables a reduction in noise while suppressing deterioration in the color reproducibility of images.

Fifth Exemplary Embodiment

Explanation next follows regarding a fifth exemplary embodiment. In the imaging device 40 according to the fifth exemplary embodiment, a Yb blend ratio table 29D employed by an image processor 10B differs from the Yb blend ratio table 29B according to the third exemplary embodiment. In the fifth exemplary embodiment, explanation follows of only the Yb blend ratio table 29D, and other parts are allocated the same reference numerals as those of the image processor 10B according to the third exemplary embodiment, and detailed explanation thereof is omitted.

In FIG. 17 illustrates a color difference ΔE*ab in a L*a*b* display color system for each color No. 0 to 17 in the Macbeth chart illustrated in FIG. 11, between cases in which the Yb blend ratio is 0% and cases in which the Yb blend ratio is 100%. For example, for the colors No. 0, 1, 6, it is apparent that there is no color difference between cases in which the Yb blend ratio is 0% and cases in which the Yb blend ratio is 100%, and so these are colors that are not affected by the Yb blend ratio. Utilizing this phenomenon, a large Yb blend ratio is computed for the colors little affected in color reproducibility by the Yb blend ratio.

For example, as illustrated in FIG. 18, in the Yb blend ratio table 29D of the fifth exemplary embodiment, the Yb blend ratio for regions 2B and 2C containing the color No. 0, 1, 6 are set with larger values (100 in the example illustrated in FIG. 18) than a standard value (50 in the example illustrated in FIG. 18).

Operation of the image processor 10B of the imaging device 40 according to the fifth exemplary embodiment differs from the image processing of the third exemplary embodiment only in the Yb blend ratio table 29D referenced a step S33 (FIG. 15), and explanation thereof is therefore omitted.

As explained above, a large Yb blend ratio is computed by the image processor 10B of the imaging device 40 according to the fifth exemplary embodiment for colors little affected by Yb blend ratio, thereby enabling an appropriate Yb blend ratio to be set. This thereby enables a reduction in noise while suppressing deterioration in the color reproducibility of images.

Sixth Exemplary Embodiment

Explanation next follows regarding a sixth exemplary embodiment. In an imaging device 40 according to the sixth exemplary embodiment, the configuration of an image processor 10E differs from the configuration of the image processor 10A according to the second exemplary embodiment. In the sixth exemplary embodiment, explanation follows only regarding the image processor 10E, and other parts are allocated the same reference numerals as those of the image processor 10A according to the second exemplary embodiment, and duplicate explanation is omitted thereof.

Figure 19:
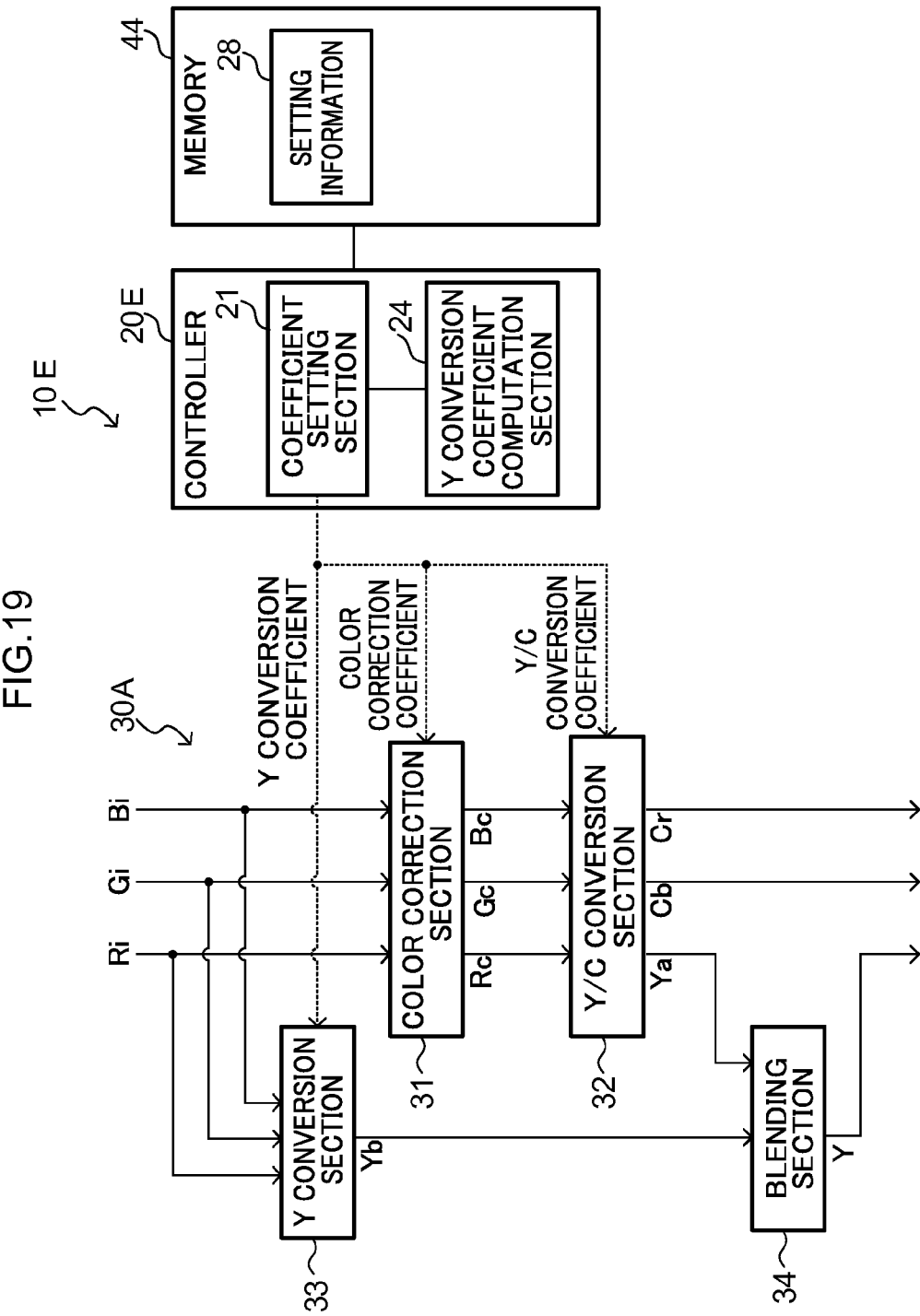
FIG. 19 is a block diagram illustrating a schematic configuration of an image processor of a sixth exemplary embodiment.

As illustrated in FIG. 19, the functions of a controller 20E to implement the image processor 10E includes a coefficient setting section 21, and a Y conversion coefficient computation section 24.

An example of color correction coefficients A, set in a color correction section 31 of an imaging device 40 such as an ordinary digital camera, is represented by Equation (1) below, and an example of Y/C conversion coefficients B set in a Y/C conversion section 32 is represented in Equation (2) below.

$$A = \begin{bmatrix} 2.15 & -1.09 & -0.57 \\ -0.17 & 1.52 & -0.35 \\ 0.01 & -0.76 & 1.75 \end{bmatrix} \qquad \text{Equation (1)}$$

$$B = \begin{bmatrix} 0.30 & 0.59 & 0.11 \\ -0.17 & -0.33 & 0.50 \\ 0.50 & -0.42 & -0.08 \end{bmatrix} \qquad \text{Equation (2)}$$

The Ya signal output from the Y/C conversion section 32 employs the input Ri signal, Gi signal, and Bi signal, and the above color correction coefficients A and Y/C conversion coefficients B, and may be simply represented by Equation (3) below.

$$Ya = 0.546Ri + 0.486Gi - 0.185Bi \qquad \text{Equation (3)}$$

In the Y conversion section 33, generally the coefficients related to the brightness signal of the Y/C conversion coefficients employed in the Y/C conversion section 32 are employed, and the Yb signal output from the Y conversion section 33 is represented by Equation (4) below. Note that in the Y/C conversion coefficient B of Equation (2), the value of each element in a single row is a coefficient related to the brightness signal.

$$Yb = 0.30Ri + 0.59Gi + 0.11Bi \qquad \text{Equation (4)}$$

When blending the Ya signal and the Yb signal in the blending section 34, the difference between the Equation (3) and the Equation (4) is a factor that causes a change in the brightness of an image, and color reproducibility deteriorates due to change in brightness.

Thus in a Y conversion coefficient computation section 24 of the sixth exemplary embodiment, the Y conversion coefficients α, β, and γ as expressed in Equation (5) below are computed such that Yb expressed in Equation (5) is close to Ya expressed in Equation (3).

$$Yb = \alpha \times Ri + \beta \times Gi + \gamma \times Bi \qquad \text{Equation (5)}$$

α, β, and γ are preferably set such that Yb is close to Ya, while reflecting the merits of both cases in which the Ya signal is 100% having the best color reproducibility, and cases in which the Yb signal is 100% having the maximum noise reduction effect. For example, the Y conversion coefficients α, β, and γ may be computed as illustrated below using the average of the respective coefficients for Ri, Gi, and Bi of Equation (3), and the respective coefficients for Ri, Gi, and Bi of Equation (4), as α, β, and γ. Any negative values are made 0.

α=(0.546+0.30)/2=0.423
β=(0.486+0.59)2=0.538
γ=(−0.185+0.11)/2=−0.0375→0

The Y conversion coefficient computation section 24 notifies the computed Y conversion coefficient to the coefficient setting section 21, and also stores this as setting information 28 in memory 44. The coefficient setting section 21 thereby sets the Y conversion section 33 with the Y conversion coefficients computed by the Y conversion coefficient computation section 24.

The blending section 34 blends the Ya signal and the Yb signal according to a pre-set Yb blend ratio (for example, 100%).

The values of each of the coefficients in Equation (1) to Equation (4) are examples, and the Y conversion coefficient computation section 24 may acquire each of the actually set coefficients from setting information 28, and then compute the Y conversion coefficients.

Figure 20:
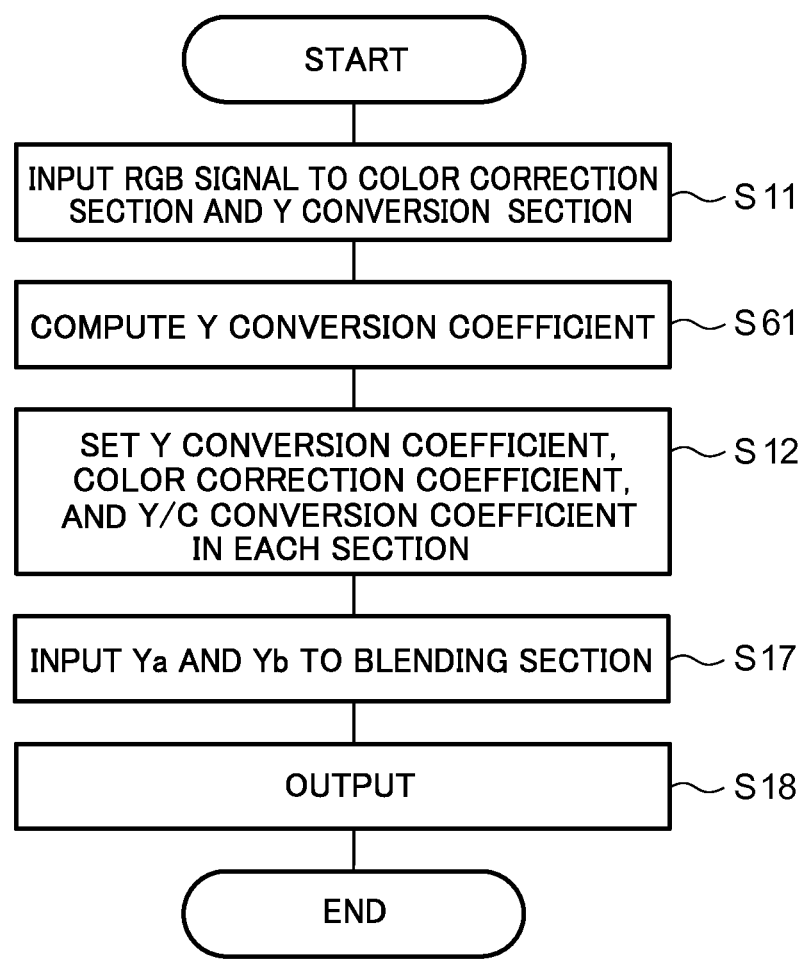
FIG. 20 is a flowchart illustrating an example of image processing in the sixth exemplary embodiment.

Explanation next follows regarding operation of the image processor 10E of the imaging device 40 according to the sixth exemplary embodiment. In the image processor 10E, the image processing illustrated in FIG. 20 is executed. The same reference numerals are allocated to image processing in the sixth exemplary embodiment similar to image processing of the first exemplary embodiment (FIG. 7), and detailed explanation thereof is omitted.

After passing through step S11 of the image processing illustrated in FIG. 20, at the next step S61, the Y conversion coefficient computation section 24 computes the Y conversion coefficient, and notifies the coefficient setting section 21 of the computed Y conversion coefficient, or stores the computed Y conversion coefficient in the memory 44 as setting information 28. Steps S12, S17, S18 are then executed similarly to in the first exemplary embodiment.

In cases in which there is no need to change the color correction coefficient, the Y/C conversion coefficients, and the Y conversion coefficient for each pixel, it is sufficient to perform the processing of step S61 only once, during the processing for the Ri signal, the Gi signal, and the Bi signal for the first pixel of the image data.

As explained above, the image processor 10E of the imaging device 40 according to the sixth exemplary embodiment computes a Y conversion coefficient according to color correction coefficients to generate the Yb signal such that the Yb signal is close to the Ya signal. This thereby enables deterioration in color reproducibility to be suppressed, while maintaining a noise reduction effect in the Yb signal.

Seventh Exemplary Embodiment

Explanation next follows regarding a seventh exemplary embodiment. An imaging device 40 according to the seventh exemplary embodiment includes an image processor 10F with a configuration different from the configuration of the image processor 10 according to the first exemplary embodiment. In the seventh exemplary embodiment, explanation follows regarding only the image processor 10F, and other parts are allocated the same reference numerals as those of the image processor 10 according to the first exemplary embodiment, and detailed explanation thereof is omitted.

Figure 21:
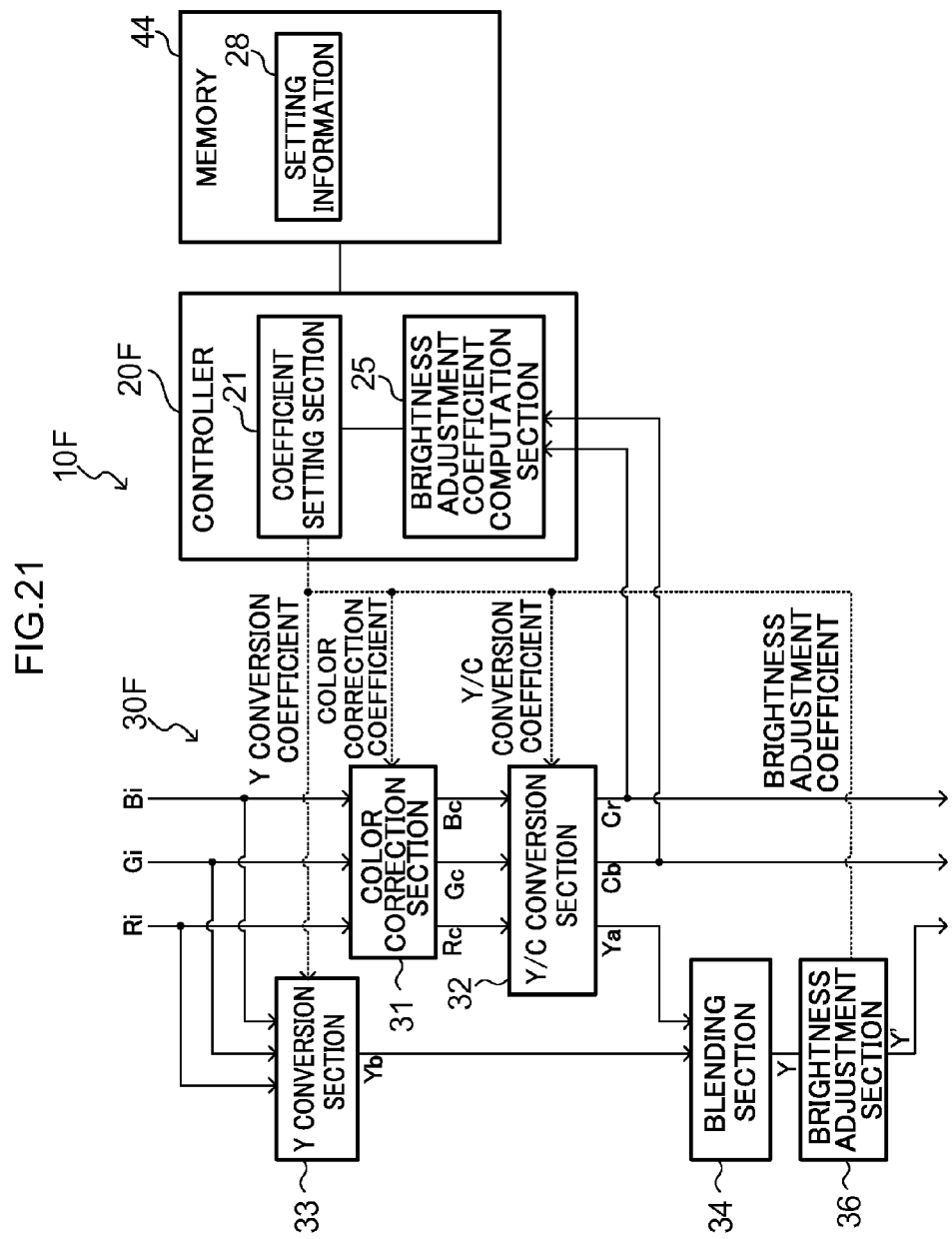
FIG. 21 is a block diagram illustrating a schematic configuration of an image processor according to a seventh exemplary embodiment.

As illustrated in FIG. 21, the functions of a controller 20F that implements the image processor 10F include a coefficient setting section 21, and a brightness adjustment coefficient computation section 25. The configuration of an image conversion section 30F that implements the image processor 1 OF includes a color correction section 31, a Y/C conversion section 32, a Y conversion section 33, a blending section 34, and a brightness adjustment section 36.

A Y signal output from the blending section 34 is input to the brightness adjustment section 36. The brightness adjustment section 36 adjusts the brightness of the Y signal using a set brightness adjustment coefficient, and outputs a Y' signal post brightness adjustment.

As also described in the sixth exemplary embodiment, a difference between the Ya signal and the Yb signal is a factor that causes a change in the brightness of an image, with a deterioration in color reproducibility resulting from the change in brightness. Particularly for colors in a primary color system, there are colors whose brightness increases due to color correction, such as when strong color correction is performed and brightness is increased, and also colors whose brightness decreases.

Similarly to in the third exemplary embodiment, in the brightness adjustment coefficient computation section 25, for each divided region in a color difference plane a brightness adjustment coefficient is computed to decrease the brightness of a region in cases in which brightness is increased by color correction of the colors included in that region. Moreover, a brightness adjustment coefficient is computed to increase the brightness of a region in cases in which brightness is decreased by color correction of the colors included in that region. The extent by which the brightness is increased or decreased by color correction differs depending on the strength of color correction, and so the brightness adjustment coefficient is a coefficient that decreases or increases the brightness by an extent that depends on the strength of color correction. The brightness adjustment coefficient computation section 25 sets the brightness adjustment section 36 with the computed brightness adjustment coefficient.

Figure 22:
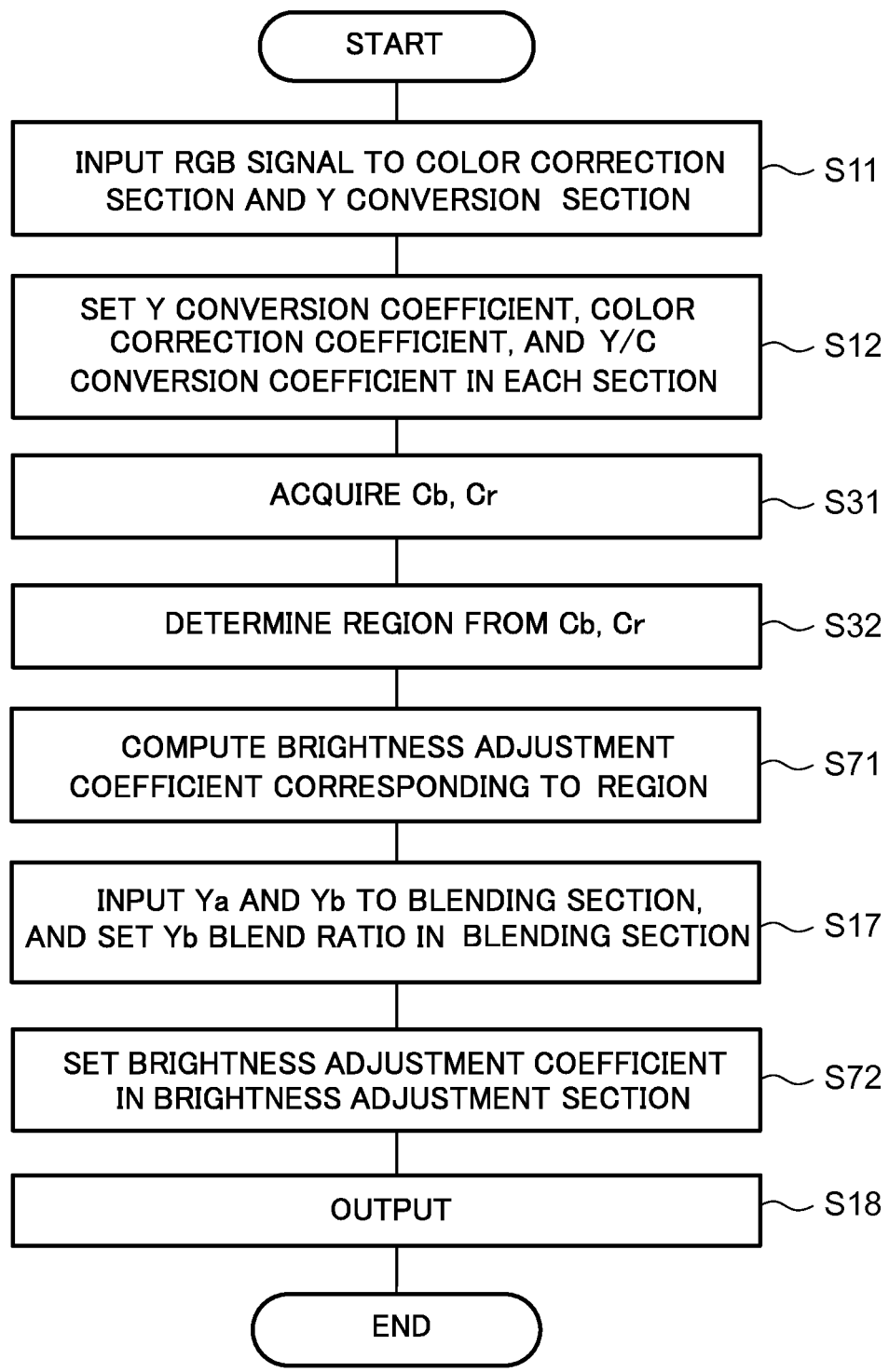
FIG. 22 is a flowchart illustrating an example of image processing in the seventh exemplary embodiment.

Explanation next follows regarding operation of the image processor 10F of the imaging device 40 according to the seventh exemplary embodiment. The image processing illustrated in FIG. 22 is executed in the image processor 10F. For the image processing in the seventh exemplary embodiment, the same reference numerals are allocated to processing the same as that of the image processing in the first exemplary embodiment (FIG. 7) and the image processing in the third exemplary embodiment (FIG. 15), and detailed explanation thereof is omitted After passing through steps S11, S12 of the image processing illustrated in FIG. 22, at the next steps S31 and S32, the brightness adjustment coefficient computation section 25 acquires a Cb signal and a Cr signal output from a Y/C conversion section 32. Then the region in the color difference plane is determined at the next step S32. Next, at step S71, the brightness adjustment coefficient computation section 25 computes a brightness adjustment coefficient according to the region determined at step S32. Next, after passing through step S17, at the next step S72, the brightness adjustment coefficient computation section 25 sets the brightness adjustment section 36 with the computed brightness adjustment coefficient. The brightness adjustment section 36 thereby adjusts the brightness of the Y signal using the set brightness adjustment coefficient, and outputs a Y' signal post brightness adjustment. Step S18 is then executed similarly to in the first exemplary embodiment.

As explained above, the image processor 10F of the imaging device 40 according to the seventh exemplary embodiment directly adjusts the brightness that has been changed by blending the Ya signal and the Yb signal, rather than changing a coefficient that affects the noise. This thereby enables deterioration in color reproducibility to be suppressed, while maintaining a noise reduction effect of the Yb signal.

Eighth Exemplary Embodiment

Explanation next follows regarding an eighth exemplary embodiment. The eighth exemplary embodiment is an exemplary embodiment including an image processor 10G combining the image processors of the first exemplary embodiment, the fifth exemplary embodiment, and the seventh exemplary embodiment. The same reference numerals are allocated to parts of the eighth exemplary embodiment similar to those of the first exemplary embodiment, the fifth exemplary embodiment, and the seventh exemplary embodiment, and detailed explanation thereof is omitted.

Figure 23:
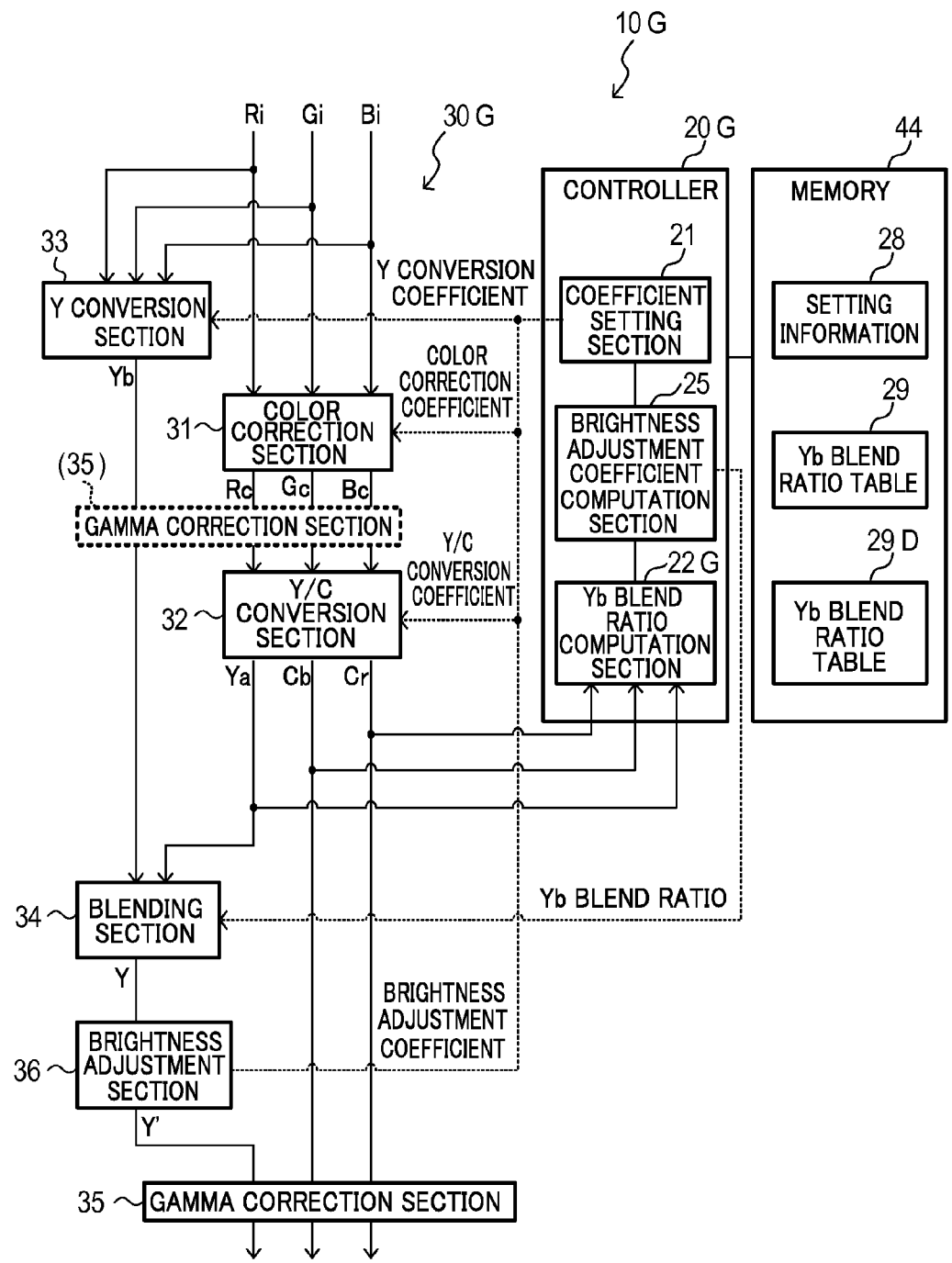
FIG. 23 is a block diagram illustrating a schematic configuration of an image processor in an eighth exemplary embodiment.

As illustrated in FIG. 23, the functions of a controller 20G implementing the image processor 10G include a coefficient setting section 21, a Yb blend ratio computation section 22G and a brightness adjustment coefficient computation section 25. The configuration of the image conversion section 30G that implements the image processor 10G includes a color correction section 31, a Y/C conversion section 32, a Y conversion section 33, a blending section 34, a gamma correction section 35, and a brightness adjustment section 36.

Similarly to in the first exemplary embodiment, in some cases the gamma correction section 35 is provided at an early stage, and in some cases provided at a later stage. In cases in which the gamma correction section 35 is provided at the later stage, a Y' signal output from the brightness adjustment section 36, and a Cb signal and a Cr signal output from the Y/C conversion section 32, are input to the gamma correction section 35. Cases in which the gamma correction section 35 is provided at the early stage are similar to those of the first exemplary embodiment.

Similarly to the Yb blend ratio computation section 22 according to the first exemplary embodiment, the Yb blend ratio computation section 22G references a Yb blend ratio table 29 such as the example illustrated in FIG. 4 or FIG. 6, and computes a Yb blend ratio 1 according to the Ya signal output from the Y/C conversion section 32. Similarly to the Yb blend ratio computation section 22B according to the fifth exemplary embodiment, the Yb blend ratio computation section 22G acquires the Cb signal and the Cr signal output from the Y/C conversion section 32, and determines the region in the color difference plane. The Yb blend ratio computation section 22G then references a Yb blend ratio table 29D such as the example illustrated in FIG. 18, and computes a Yb blend ratio 2 according to the determined region.

Moreover, the Yb blend ratio computation section 22G merges the computed Yb blend ratio 1 and Yb blend ratio 2 to compute a final Yb blend ratio. For example, in cases in which the Yb blend ratio 1 is 40% (=0.4), and the Yb blend ratio 2 is 70% (=0.7), a final Yb blend ratio may be computed to be 0.4×0.7=0.28 (28%). Note there is no limitation to this example of a computation method for the final Yb blend ratio, and the final Yb blend ratio may, for example, be computed as an average, or a weighted average, of the two Yb blend ratios.

Figure 24:
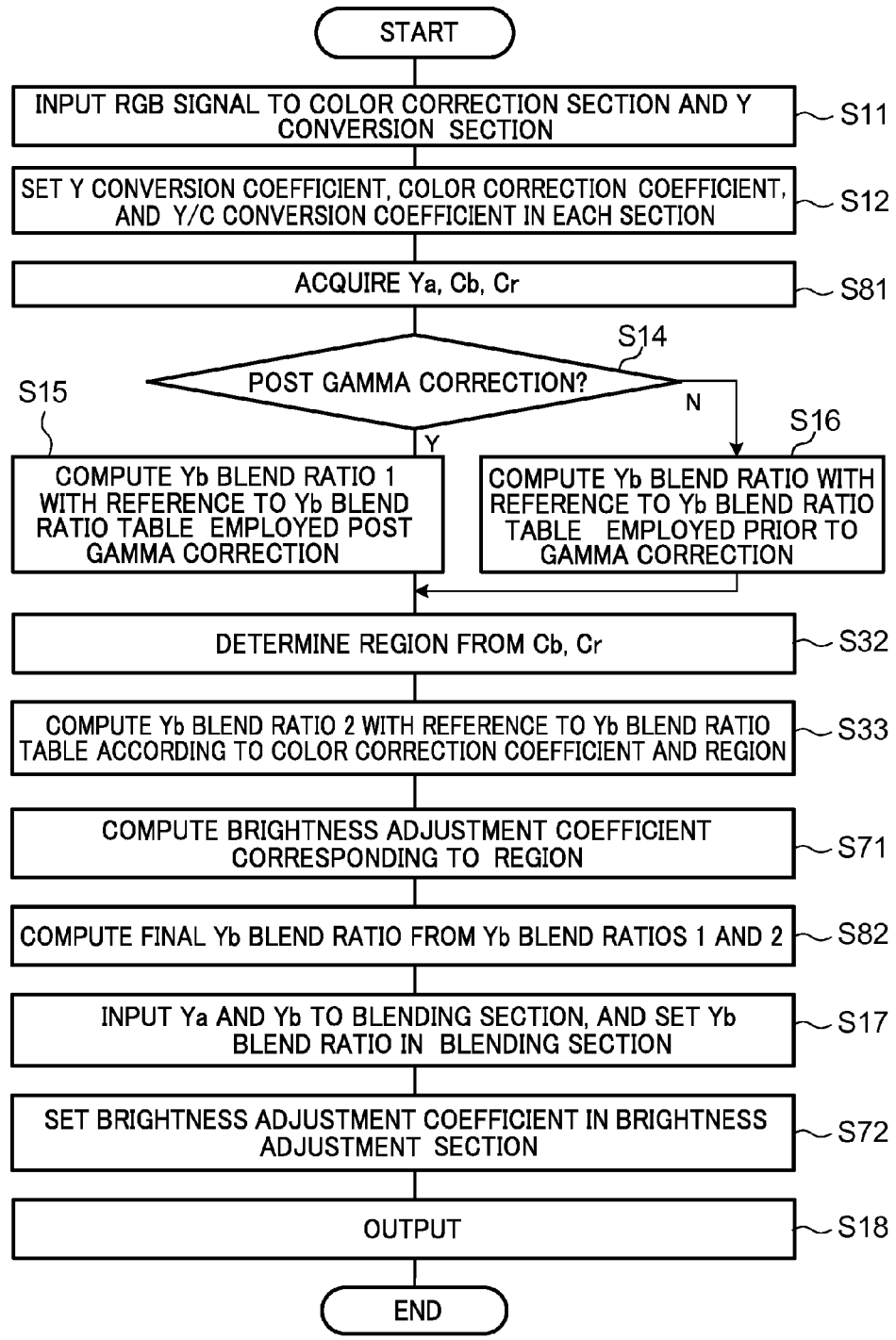
FIG. 24 is a flowchart illustrating an example of image processing in the eighth exemplary embodiment.

Explanation next follows regarding operation of the image processor 10G of the imaging device 40 according to the eighth exemplary embodiment. The image processing illustrated in FIG. 24 is executed in the image processor 10G. The same reference numerals are allocated to image processing in the eighth exemplary embodiment similar to processing in the image processing in the first exemplary embodiment (FIG. 7), the image processing in the third exemplary embodiment (FIG. 15), and the image processing in the seventh exemplary embodiment (FIG. 22), and detailed explanation thereof is omitted.

After passing through steps S11 and S12 of the image processing illustrated in FIG. 24, at the next step S81, the Yb blend ratio computation section 22G acquires the Ya signal, the Cb signal, and the Cr signal output from the Y/C conversion section 32.

Then at steps S14 to S16, the Yb blend ratio computation section 22G selects the Yb blend ratio table 29 according to the signal prior to gamma correction, or the signal post gamma correction, of the acquired Ya signal, and computes the Yb blend ratio 1 according to the level of the Ya signal.

Next, at steps S32 and S33, the Yb blend ratio computation section 22G determines the region in the color difference plane from the acquired Cb signal and Cr signal, and computes the Yb blend ratio 2 according to the region with reference to the Yb blend ratio table 29D.

Next, at step S71, the brightness adjustment coefficient computation section 25 computes the brightness adjustment coefficient according to the region determined by the Yb blend ratio computation section 22G at step S32. Next, at step S82, the Yb blend ratio computation section 22G merges the Yb blend ratio 1 computed at step S15 or S16, and the Yb blend ratio 2 computed at step S33, and computes the final Yb blend ratio. Steps S17, S72, and S18 are then executed similarly to in the seventh exemplary embodiment.

As explained above, the image processor 10G of the imaging device 40 according to the eighth exemplary embodiment obtains similar advantageous effects to those of the first exemplary embodiment, the fifth exemplary embodiment, and the seventh exemplary embodiment.

Note that although explanation has been given in the eighth exemplary embodiment of a combination of the first exemplary embodiment, the fifth exemplary embodiment, and the seventh exemplary embodiment, exemplary embodiments may be made with any suitable combination of at least two of the first to seventh exemplary embodiments. For example, the first exemplary embodiment and the second exemplary embodiment may be combined. In such cases, there are two axes for changing the Yb blend ratio, enabling fine control to be achieved.

A combination may be made from at least one of the first or second exemplary embodiments, with at least one of the third, fourth, and fifth exemplary embodiments. In cases in which appropriate processing is performed on colors of images, computation using hardware becomes complicated when color is discriminated by 3 elements (brightness, saturation, hue), and a large memory capacity is needed. However, since such a combination of exemplary embodiment enables processing to be split into processing for brightness, saturation, and hue, the computation load of individual hardware elements is lessened, suppressing the need for memory capacity.

At least one of the first to the fifth exemplary embodiment may also be combined with the sixth exemplary embodiment. Due the sixth exemplary embodiment having a different area of action to that of other exemplary embodiments, synergistic advantageous effects are obtained to the noise reduction and color reproducibility in each of the exemplary embodiments.

At least one of the first to the sixth exemplary embodiment may also be combined with the seventh exemplary embodiment. Disposing a brightness adjustment section in series at the later stage as in the seventh exemplary embodiment enables adjustment of changes brightness that were not able to be completely suppressed, or were not able to be suppressed at all, by early stage processing.

Figure 25:
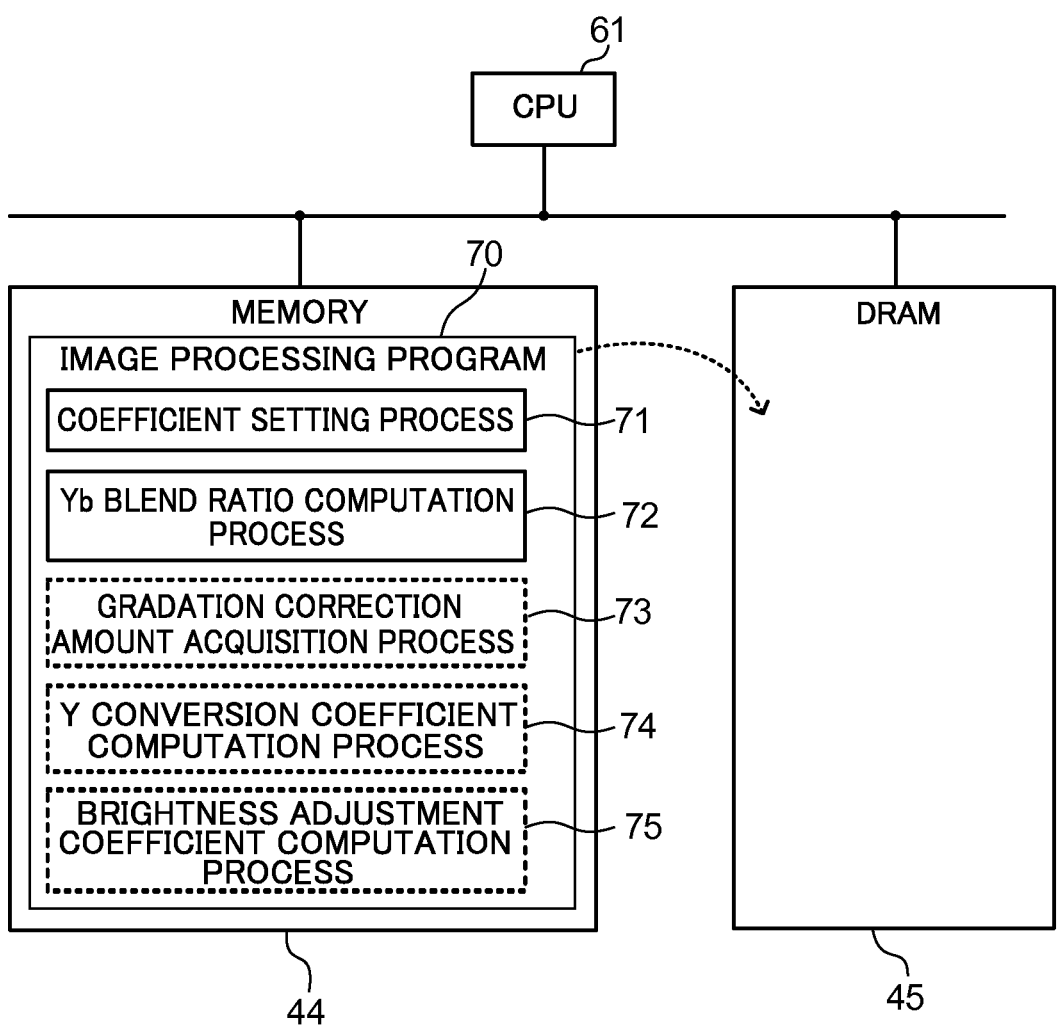
FIG. 25 is a block diagram illustrating a configuration example when image processing of each exemplary embodiment is executed by a program.

The image processing in each of the first to the eighth exemplary embodiment can be executed by a program. For example, as illustrated in FIG. 25, a CPU 61 reads, from memory 44, an image processing program 70 stored in the memory 44, expands the image processing program 70 in DRAM 45, and then the CPU 61 sequentially executes the processes of the image processing program 70.

The image processing program 70 includes a coefficient setting process 71 and a Yb blend ratio computation process 72. The image processing program 70 may include a gradation correction amount acquisition process 73, a Y conversion coefficient computation process 74, and a brightness adjustment coefficient computation process 75. The CPU 61 operates as each of the functional sections of the controller 20 by execution of each of the processes.

The image processing program 70 is not limited to being pre-stored (pre-installed) in the memory 44, and may be provided in a format stored on a recording medium, such as a CD-ROM or DVD-ROM.

In the related technology, the ratio of the Yb signal is made greater when combining the Ya signal and the Yb signal in order to perform edge emphasis processing on image data input as an RGB signal and to output the processed RBG signal. This thereby enables a noise reduction effect to be obtained. However, the Yb signal in the related technology is a brightness signal that has not had color correction performed thereon, and so there is a deterioration of color reproducibility of images if there is a large Yb blend ratio in the brightness signal of the combined images.

An aspect of technology disclosed herein is capable of reducing noise, while suppressing deterioration in color reproducibility of images.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing device, comprising:
   a color correction section that is input with an RGB signal, and performs color correction on the RGB signal;
   a YC conversion section that converts the color corrected RGB signal to a first brightness signal and a color difference signal;
   a Y conversion section that is input with the RGB signal, and generates a second brightness signal from the RGB signal;
   a processor configured to execute a process, the process comprising computing a first ratio at which to combine the first brightness signal and the second brightness signal based on the RGB signal; and
   a combining section that combines the first brightness signal and the second brightness signal at the computed first ratio,
   wherein, in cases in which the first brightness signal and the second brightness signal that are combined by the combining section are signals prior to gamma correction, the first ratio is computed based on a first ratio table including a relationship such that a second ratio of the second brightness signal to the first brightness signal increases as a level of the first brightness signal increases, and, in cases in which the first brightness signal and the second brightness signal that are combined in the combining section are signals after the gamma correction, the first ratio is computed based on a second ratio table that is different from the first ratio table.

2. The image processing device of claim 1, wherein the second ratio table is table information in which a third ratio of the second brightness signal to the first brightness signal is determined so as to add together a characteristic whereby the second ratio of the second brightness signal to the first brightness signal increases as the level of the first brightness signal increases, and a gamma characteristic of the gamma correction.

3. An image processing device, comprising:
   a color correction section that is input with an RGB signal, and performs color correction on the RGB signal;
   a YC conversion section that converts the color corrected RGB signal to a first brightness signal and a color difference signal;
   a Y conversion section that is input with the RGB signal, and generates a second brightness signal from the RGB signal;
   a processor configured to execute a process, the process comprising computing a first ratio at which to combine the first brightness signal and the second brightness signal based on the RGB signal; and
   a combining section that combines the first brightness signal and the second brightness signal at the computed first ratio,
   wherein the first ratio is computed based on a standard deviation of the color corrected RGB signal.

4. The image processing device of claim 3, wherein, for each of a plurality of divided regions in a color difference plane, the first ratio is computed based on table information in which a second ratio of the second brightness signal to the first brightness signal is determined so as to increase in conjunction with an increase in the standard deviation after color correction of an RGB signal representing a color contained in the region, and based on the color difference signal converted by the YC conversion section.

5. An image processing device, comprising:
   a color correction section that is input with an RGB signal, and performs color correction on the RGB signal;
   a YC conversion section that converts the color corrected RGB signal to a first brightness signal and a color difference signal;
   a Y conversion section that is input with the RGB signal, and generates a second brightness signal from the RGB signal;
   a processor configured to execute a process, the process comprising computing a first ratio at which to combine the first brightness signal and the second brightness signal based on the RGB signal; and
   a combining section that combines the first brightness signal and the second brightness signal at the computed first ratio,
   wherein the first ratio is computed based on the color corrected RGB signal, a degree of importance placed on color reproducibility, and table information in which a second ratio of the second brightness signal to the first brightness signal is determined for each of a plurality of divided regions in a color difference plane, and in which the second ratio of the second brightness signal for a predetermined region containing a color for which color reproducibility is considered important is determined as a value larger than the second ratio of the second brightness signal for other regions, and based on the color difference signal converted by the YC conversion section.

6. An image processing device, comprising:
a color correction section that is input with an RGB signal, and performs color correction on the RGB signal;
a YC conversion section that converts the color corrected RGB signal to a first brightness signal and a color difference signal;
a Y conversion section that is input with the RGB signal, and generates a second brightness signal from the RGB signal;
a processor configured to execute a process, the process comprising computing a first ratio at which to combine the first brightness signal and the second brightness signal based on the RGB signal; and
a combining section that combines the first brightness signal and the second brightness signal at the computed first ratio,
wherein the first ratio is computed based on a relationship between a second ratio of the second brightness signal to the first brightness signal and a color difference between before and after the combining.

7. The image processing device of claim 6, wherein the first ratio is computed based on table information in which the second ratio of the second brightness signal determined for each of a plurality of divided regions in a color difference plane, and in which the second ratio of the second brightness signal increases in conjunction with a decrease in the color difference between before and after the combining according to the second ratio of the second brightness signal of the color contained in the region, and based on the color difference signal converted by the YC conversion section.

8. An image processing device, comprising:
a color correction section that is input with an RGB signal, and performs color correction on the RGB signal;
a YC conversion section that converts the color corrected RGB signal to a first brightness signal and a color difference signal;
a Y conversion section that is input with the RGB signal, and generates a second brightness signal from the RGB signal;
a processor configured to execute a process, the process comprising computing a ratio at which to combine the first brightness signal and the second brightness signal based on the RGB signal; and
a combining section that combines the first brightness signal and the second brightness signal at the computed ratio,
wherein in cases in which a plurality of ratios have been computed based on the RGB signal, when computing the ratio, the plurality of ratios are merged to compute a final ratio.

9. An image processing method, comprising:
by a color correction section input with an RGB signal, performing color correction on the RGB signal;
by a YC conversion section, converting the color corrected RGB signal to a first brightness signal and a color difference signal;
by a Y conversion section input with the RGB signal, generating a second brightness signal from the RGB signal;
by a processor, computing a first ratio at which to combined the first brightness signal and the second brightness signal based on the RGB signal; and
by a combining section, combining the first brightness signal and the second brightness signal using the computed first ratio,
wherein, in cases in which the first brightness signal and the second brightness signal that are combined by the combining section are signals prior to gamma correction, the first ratio is computed based on a first ratio table including a relationship such that a second ratio of the second brightness signal to the first brightness signal increases as a level of the first brightness signal increases, and, in cases in which the first brightness signal and the second brightness signal that are combined in the combining section are signals after the gamma correction, the first ratio is computed based on a second ratio table that is different from the first ratio table.

10. An image processing method, comprising:
by a color correction section input with an RGB signal, performing color correction on the RGB signal;
by a YC conversion section, converting the color corrected RGB signal to a first brightness signal and a color difference signal;
by a Y conversion section input with the RGB signal, generating a second brightness signal from the RGB signal;
by a processor, computing a ratio at which to combined the first brightness signal and the second brightness signal based on the RGB signal; and
by a combining section, combining the first brightness signal and the second brightness signal using the computed ratio,
wherein the ratio is computed based on a standard deviation of the color corrected RGB signal.

11. An image processing method, comprising:
by a color correction section input with an RGB signal, performing color correction on the RGB signal;
by a YC conversion section, converting the color corrected RGB signal to a first brightness signal and a color difference signal;
by a Y conversion section input with the RGB signal, generating a second brightness signal from the RGB signal;
by a processor, computing a first ratio at which to combined the first brightness signal and the second brightness signal based on the RGB signal; and
by a combining section, combining the first brightness signal and the second brightness signal using the computed first ratio,
wherein the first ratio is computed based on a relationship between a second ratio of the second brightness signal to the first brightness signal and a color difference between before and after the combining.

12. An image processing method, comprising:
by a color correction section input with an RGB signal, performing color correction on the RGB signal;
by a YC conversion section, converting the color corrected RGB signal to a first brightness signal and a color difference signal;
by a Y conversion section input with the RGB signal, generating a second brightness signal from the RGB signal;
by a processor, computing a ratio at which to combined the first brightness signal and the second brightness signal based on the RGB signal; and
by a combining section, combining the first brightness signal and the second brightness signal using the computed ratio, wherein, in cases in which a plurality of ratios have been computed based on the RGB signal, when computing the ratio, the plurality of ratios are merged to compute a final ratio.

* * * * *